US011993335B2

(12) United States Patent
Cordero

(10) Patent No.: US 11,993,335 B2
(45) Date of Patent: May 28, 2024

(54) COMPACT FOLDABLE SCOOTER AND MANUFACTURE METHOD OF THE SAME

(71) Applicant: Armando Luis Cordero, Riverside, CA (US)

(72) Inventor: Armando Luis Cordero, Riverside, CA (US)

( * ) Notice: Subject to any disclaimer, the term of this patent is extended or adjusted under 35 U.S.C. 154(b) by 0 days.

(21) Appl. No.: 18/130,437

(22) Filed: Apr. 4, 2023

(65) Prior Publication Data
US 2023/0257058 A1 Aug. 17, 2023

Related U.S. Application Data

(60) Division of application No. 17/079,546, filed on Oct. 26, 2020, now Pat. No. 11,679,836, which is a
(Continued)

(51) Int. Cl.
| | |
|---|---|
| *B60K 15/00* | (2006.01) |
| *B62J 43/16* | (2020.01) |
| *B62K 11/10* | (2006.01) |
| *B62K 11/14* | (2006.01) |
| *B62K 15/00* | (2006.01) |
| *B62K 25/04* | (2006.01) |
| *B62M 9/00* | (2006.01) |

(Continued)

(52) U.S. Cl.
CPC ............ *B62K 15/008* (2013.01); *B62J 43/16* (2020.02); *B62K 11/10* (2013.01); *B62K 11/14* (2013.01); *B62K 25/04* (2013.01); *B62M 9/00* (2013.01); *B62M 11/00* (2013.01); *B62J 43/30* (2020.02); *B62J 50/22* (2020.02); *B62K 2202/00* (2013.01); *F16D 41/24* (2013.01)

(58) Field of Classification Search
CPC ..... B60K 3/002; B60K 2202/00; B62K 11/14
See application file for complete search history.

(56) References Cited

U.S. PATENT DOCUMENTS

| | | | |
|---|---|---|---|
| 7,293,622 B1 * | 11/2007 | Spital | A63C 17/12 |
| | | | 180/181 |
| 10,407,119 B1 * | 9/2019 | Greenberg | B62K 15/006 |

(Continued)

FOREIGN PATENT DOCUMENTS

CN 102763964 A * 11/2012

OTHER PUBLICATIONS

Wim Oporte, A Luggage Case with Scooter Device, Nov. 7, 2012, EPO, CN 102763964 A, Machine Translation of Description (Year: 2012).*

*Primary Examiner* — James A English
(74) *Attorney, Agent, or Firm* — Bayramoglu Law Offices LLC

(57) ABSTRACT

A foldable electric scooter and a manufacture method of the same. The foldable electric scooter includes a main body assembly, a front fork assembly located at the front end of the main body assembly, a rear fork assembly located at the rear end of the main body assembly, a telescoping plate assembly located on top of the front fork assembly and a handlebar assembly located on top of the telescoping plate assembly. The foldable electric scooter has a double headset design that increases a rake angle for more steering stability while still keeping the steering upright for an upright holding of the handlebars. The foldable electric scooter is manufactured by stamping of flat plate material.

15 Claims, 30 Drawing Sheets

Related U.S. Application Data continuation-in-part of application No. 15/716,480, filed on Sep. 26, 2017, now Pat. No. 10,850,783.

(51) Int. Cl.
  *B62M 11/00* (2006.01)
  *B62J 43/30* (2020.01)
  *B62J 50/22* (2020.01)
  *F16D 41/24* (2006.01)

(56) References Cited

U.S. PATENT DOCUMENTS

| | | | |
|---|---|---|---|
| 11,697,470 B1* | 7/2023 | Wang | A63C 17/01 180/220 |
| 2008/0141821 A1* | 6/2008 | Degarate | B62K 21/12 74/551.8 |
| 2015/0321722 A1* | 11/2015 | Dadoosh | B62K 15/006 320/109 |

* cited by examiner

COMPACT FOLDABLE SCOOTER AND MANUFACTURE METHOD OF THE SAME

CROSS-REFERENCE TO RELATED APPLICATIONS

This application is a divisional application of U.S. patent application Ser. No. 17/079,546 filed on Oct. 26, 2020, which is a continuation-in-part application of U.S. patent application Ser. No. 15/716,480 filed Sep. 26, 2017, the entire contents of which are incorporated herein by reference.

TECHNICAL FIELD

The present application relates to the field of scooters, and more particularly to a compact foldable electric scooter and a manufacture method of the same.

BACKGROUND

In daily life, people can drive to the office or the classroom, but there is a problem of "last mile commuting". Such short distance commuting like walking usually takes an excessive amount of time. Available transportation options are (either manual or electronic) bikes, scooters, skateboards, etc. However, none of these options possess the lightness of weight, ease of use, and compactness desired by the user at the same time.

An electric scooter is a good choice for the user. However, some defects exist along with electric scooters available on today's market. Most traditional recreational motorized scooters are relatively large and require heavy hub motors to propel the scooter. Besides, the existing scooter cannot be folded into the size and weight which is easy to carry. This flaw results from its manufacturing method. Traditional scooters typically use bent tubes welded together. Another option is the extrusion equipment. However, those existing manufacture methods require skilled laborers and large initial investment.

The direct extrusion process is the most common manufacturing method of scooters. However, such method has several defects. For example, the die is expensive to manufacture. Also, Extrusion Machines take up a lot of space and are very expensive. Moreover, limited folding capabilities due to the geometric design of the die is undesired. Extruding metal through a die limits the way the scooter can be folded. Further, the electric scooter manufactured by this method weighs from 23.6 to 34 pounds. Thus, it is inconvenient to carry.

Therefore, there is a need to provide a scooter such as an electric scooter that is light and compact enough to be concealed. Also, a different method of manufacturing the scooter that is capable of folding and weighing less is desired.

SUMMARY

One purpose of the present application is to provide a scooter, such as an electric scooter, that has a flexible design, where a front fork assembly, a rear fork assembly and a handlebar fold via pivoting and a telescoping plate assembly collapses to minimize the whole volume of the electric scooter for facilitating transportation and storage. Another purpose of the present invention is to provide a method of manufacturing the electric scooter.

The electric scooter comprises a main body assembly, a front fork assembly located at the front end of the main body assembly, a rear fork assembly located at the rear end of the main body assembly, a telescoping plate assembly located on top of the front fork assembly and a handlebar assembly located on top of the telescoping plate assembly.

The folding procedure of the electric scooter is as follows: While holding the upper telescoping plate handle, push down on telescoping plate assembly and along direction towards the front fork assembly. Then, while holding the upper telescoping plate handle, lift up the front fork assembly along a direction off the ground and rotate the now collapsed telescoping plate assembly along a direction towards the front fork assembly. The telescoping plate assembly will rotate about pivot A. The telescoping plate assembly will come together with the front fork assembly along a direction. While holding the upper telescoping plate handle, pull on the main body handle to lift the main body assembly and the rear fork assembly off the ground along a direction towards the front fork assembly. The main body assembly will rotate about pivot B towards the front fork assembly, and the rear fork assembly will rotate about pivot C toward the main body assembly. While holding the upper telescoping plate handle, pull up on the handlebar grip latch along a direction to unlock and collapse the handlebar grips along a direction towards the rear fork assembly. Then push back down on the handlebar grip latch along a direction to lock the handlebar grips in place. The handlebar grip latch, will rotate about pivot D. The handlebar grips will rotate about pivot E. Unfolding of the electric scooter is the reverse steps of the folding procedure.

Further, the main body assembly comprises outer main body plates, inner main body plates, a battery pack assembly located at the front of the main body assembly, an electronics housing assembly located in the middle of the main body assembly, a rear suspension assembly located at the rear of the main body assembly and a main body handle.

The front fork assembly comprises of a front wheel assembly located at the front of the front fork assembly, a front suspension assembly, located in the middle of the front fork assembly, and a gooseneck assembly located at the rear of the front fork assembly.

The front suspension assembly comprises two front forks, lower headset housing crossmember, lower steering knuckle, front wheel axle, upper front fork rod, lower steering knuckle outer plates, lower suspension rocker plates, front air shock canister, lower suspension rocker plate rod, upper suspension independent control arms, upper suspension independent control arm ball joint linkage and upper suspension independent control arm rod. The air shock canister is adjustable for adjusting the ride of the user and rebound tweaking abilities.

The gooseneck assembly comprises outer gooseneck plates, upper headset housing, upper steering knuckle, upper steering knuckle plates and screws. The gooseneck assembly has two headset ball bearings located inside the upper headset housing 261.

A manufacturing method of an electric scooter includes the following steps: stamping and/or cutting two-dimensional scooter parts; and assembling the two-dimensional scooter parts into a three-dimensional electric scooter.

A preferred method of manufacturing the scooter parts is by stamping. Stamping, also known as pressing, is the process of placing flat sheet metal in either blank or coil form into a stamping press where a tool and die surface forms the metal into a desired shape. Stamping includes a variety of sheet-metal forming manufacturing processes, such as punching by using a machine press or by using a stamping press, blanking, piercing, embossing, bending, flanging, bottoming and coining. The stamping process could be a single stage operation where every stroke of the press produces the desired form on the sheet metal part or could occur through a series of stages. The process is performed on a material such as sheet metal, but can also be used on other materials, such as alloys. Moreover, stamping can be performed on cold metal sheet.

Blanking is the first step in any metal stamping procedure and involves cutting of a large sheet such as a metal into pieces which are smaller and more manageable. Blanking may be necessary when a metal stamped part must be drawn or formed.

Piercing is a shearing process in which a punch and die are used to produce parts from sheet stock such as sheet metal. Piercing can be accomplished in tandem with blanking, and piercing causes the required shapes to be punched out of the sheet-metal being used. Also, when a finished part requires some type of holes, slots, or any other kinds of cutout, piercing will generally be included in the metal stamping process.

Embossing is a process for creating at least one of a raised or recessed design in sheet metal, by pressing a raw/material blank against a die that contains a desired shape, or by passing the raw/material blank through a roller die.

Drawing constitutes the actual stamping procedure in an overall metal stamping process. When a punch forces a metal section through a die, the primary shape of the part is determined. If the depth of the part must be less than the primary opening, this is referred to as shallow drawing, and when the depth is greater than the part, this is referred to as deep-drawn.

Bending involves placing a work-in-progress part on a specially designed die, where a ram pushes against the metal imparting a necessary bend. Bending is performed after drawing, since trying to punch a piece which is already bent will almost always cause the whole part to be deformed.

One type of bending is air bending which is accomplished by having a punch bend a flat surface of a part into a die, which can be V-shaped. The space between the die and the punch is generally wider than the thickness of the metal, which results in a bend that relaxes somewhat after the part has been released. Air bending uses significantly less pressure and power than other bending possibilities.

Bottoming and coining are two processes that are similar in their results to air bending, but they use a great deal more pressure. Another difference between Bottoming and Coining methods and air bending is that material is fully forced into a tight-fitting die, which causes a permanent bend to be applied to the part.

Forming is another bending process which is very similar to bottoming and coining. The final result of forming is usually parts which have multiple bends, commonly U-bends, which are created all in a single step.

Flanging is a process of introducing a flare or flange onto a metal workpiece through the use of dies, presses, or specialized flanging machinery.

Pinch trimming is a process where a piece is cut from a section of sheet metal, so as to separate the cut piece from any scrap and the metal is pinched up against a surface which is flat and vertical. Pinch trimming is generally used to cut deep-drawn circular cups from a sheet of metal.

Lancing is a process used to make tabs or vents when cutting metal. One section of a part is cut along three edges at the same time and is bent intentionally. This creates the necessary hook-like feature or opening, while eliminating the need for a secondary machining step, or any kind of scrap collection.

A preferred stamping method of manufacturing the scooter parts is by fineblanking. Fineblanking is a specialty type of metal stamping that can achieve parts such as flatness and a full sheared edge to a degree that is nearly impossible using a conventional metal cutting or punching process. In fineblanking, the manufactured product will need to have a full contact surface on an edge of the part. For example, a gear can be made by fineblanking because the gear requires critical flatness and must have every tooth fully engaged with the gear that it mates to throughout the entire thickness of the part. Also, fineblanking can pierce very small holes with respect to the metal thickness, as well as holes very close to the edge of the part and close to other holes.

Furthermore, material of the wheel spacer plate, the inner wheel plate, and the outer wheel plate can be selected from the group consisting of plastic, aluminum, stainless steel, carbon fiber, paper, metal, and ceramics.

Furthermore, the step of cutting two-dimensional scooter parts can be performed by a Laser cutter.

Furthermore, two-dimensional scooter parts can be nesting in one piece of flat raw material. Nesting refers to the process of laying out cutting patterns to minimize the raw material waste.

The electric scooter of the present application is beneficial to those who are looking for a comfortable and easy ride experiences in different respects, such as wide standing platform, front and rear suspension, drive transmission for increased torque, neutral for coasting down hills without engaging the motor.

The electric scooter of the present application has a unique folding design which allows it to take up a substantially less amount of surface area than traditional scooters.

The electric scooter of the present application is able to fit completely inside of a backpack, staying compact when put away.

When compressed the electric scooter of the present application, the scooter is convenient to store and can be moved easily. The electric scooter is capable of higher speeds due to the smaller size and the lightweight brushless electric motor. The electric scooter of the present application has a flexible design which permits the scooter to be carried around while exhibiting the form and function of other existing electric scooters.

The electric scooter of the present application may be folded into each other creating less surface area than prior scooters. Meanwhile, the electric scooter of the present application retains the unfolded dimensions of prior scooters. Thus, the electric scooter of the present application is competitive in the market.

DETAILED DESCRIPTION

Hereinafter this invention will be further described in conjunction with the accompanying figures and embodiments.

The inventor provides a folding electric scooter made of two-dimensional plates that enables the scooter to have unique folding capabilities and enhanced performance characteristics. The new electric scooter incorporates lean manufacturing processes to improve efficiency, reduce waste and increase productivity. The present invention is described in enabling detail in the following examples, which may present more than one embodiment of the present invention.

Figure 1:
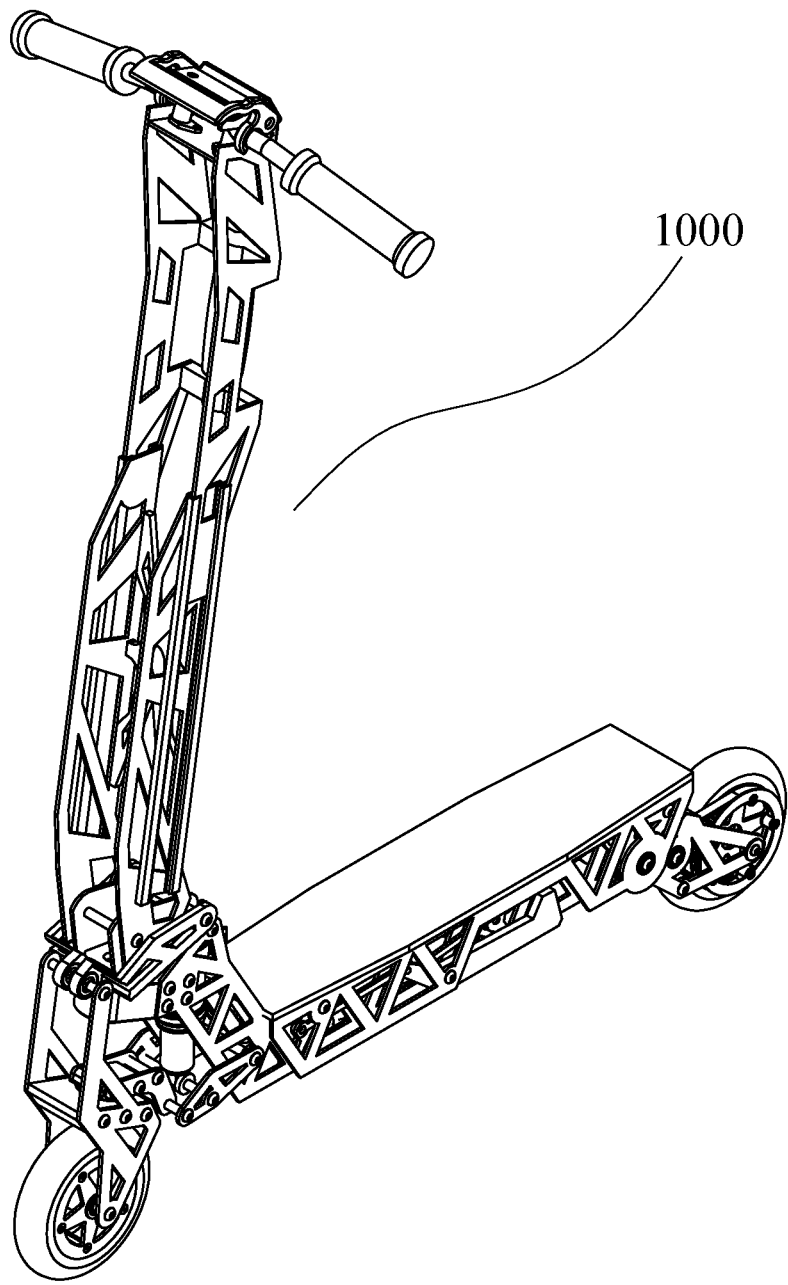
FIG. 1 is a perspective view of an electric scooter in an open position in accordance with a preferred embodiment of the present invention.
Figure 2:
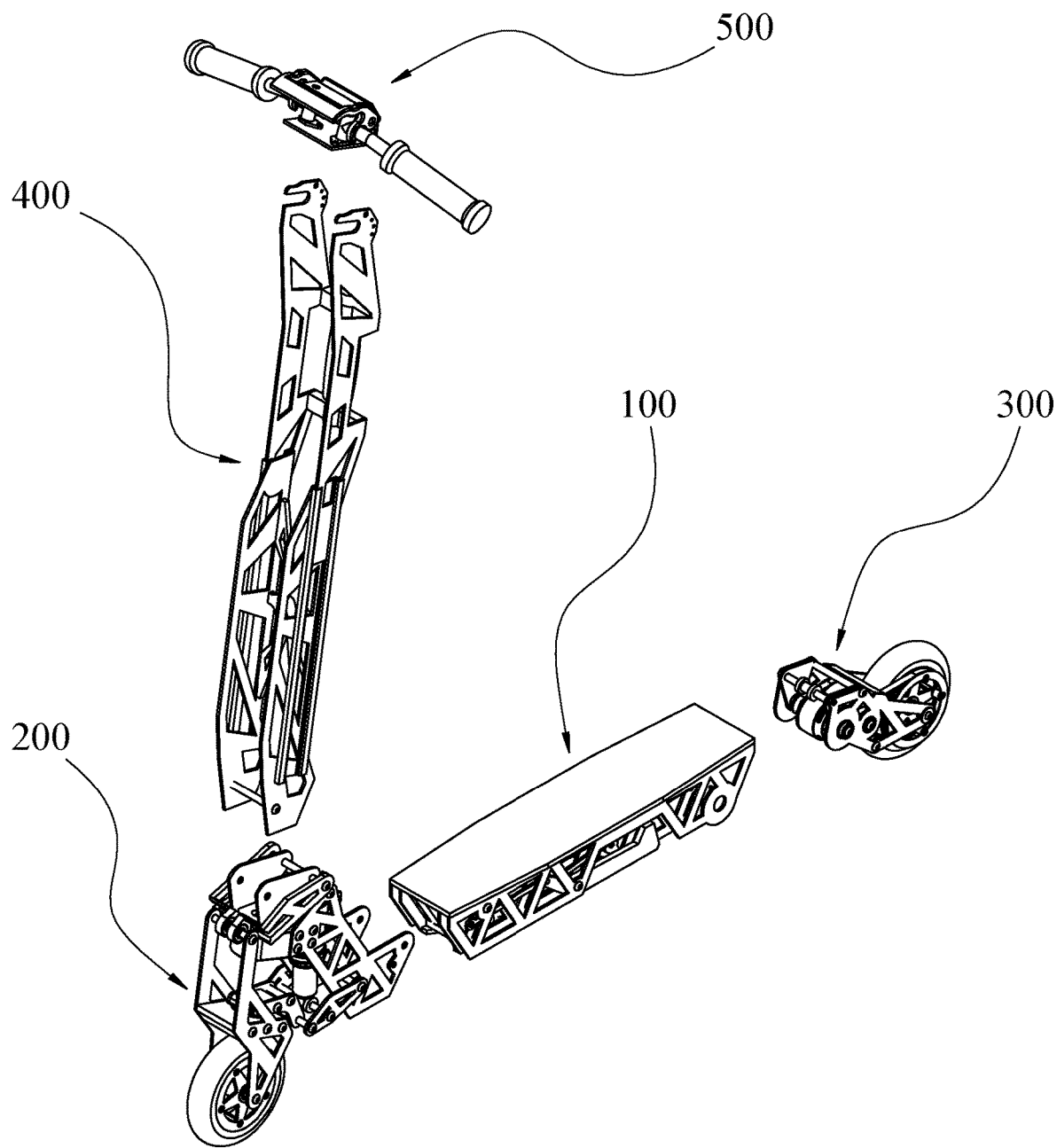
FIG. 2 is an exploded, perspective view of the electric scooter in the open position in accordance with a preferred embodiment of the present invention.
Figure 3:
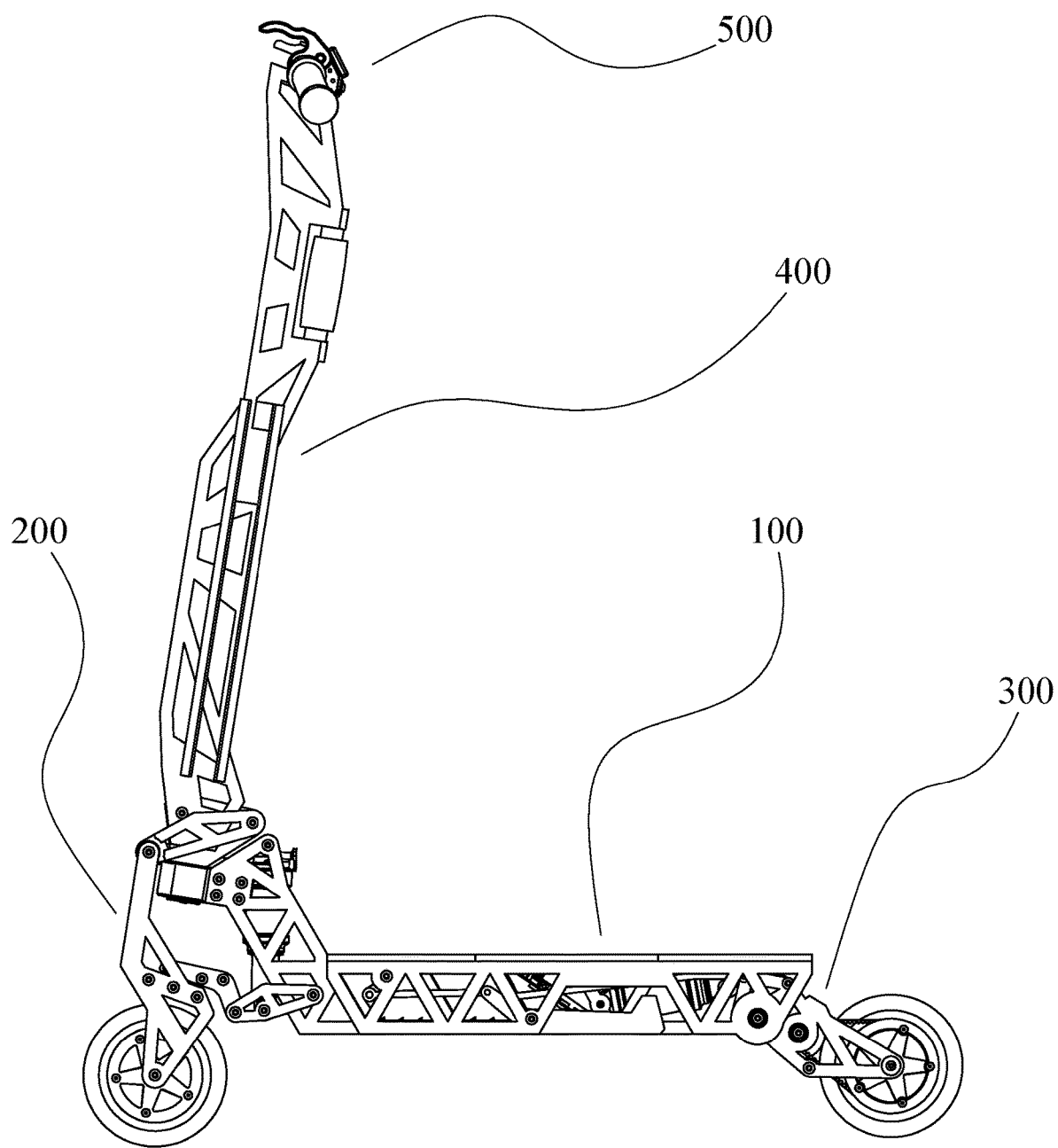
FIG. 3 is a side view of the electric scooter in the open position in accordance with a preferred embodiment of the present invention.
Figure 18:
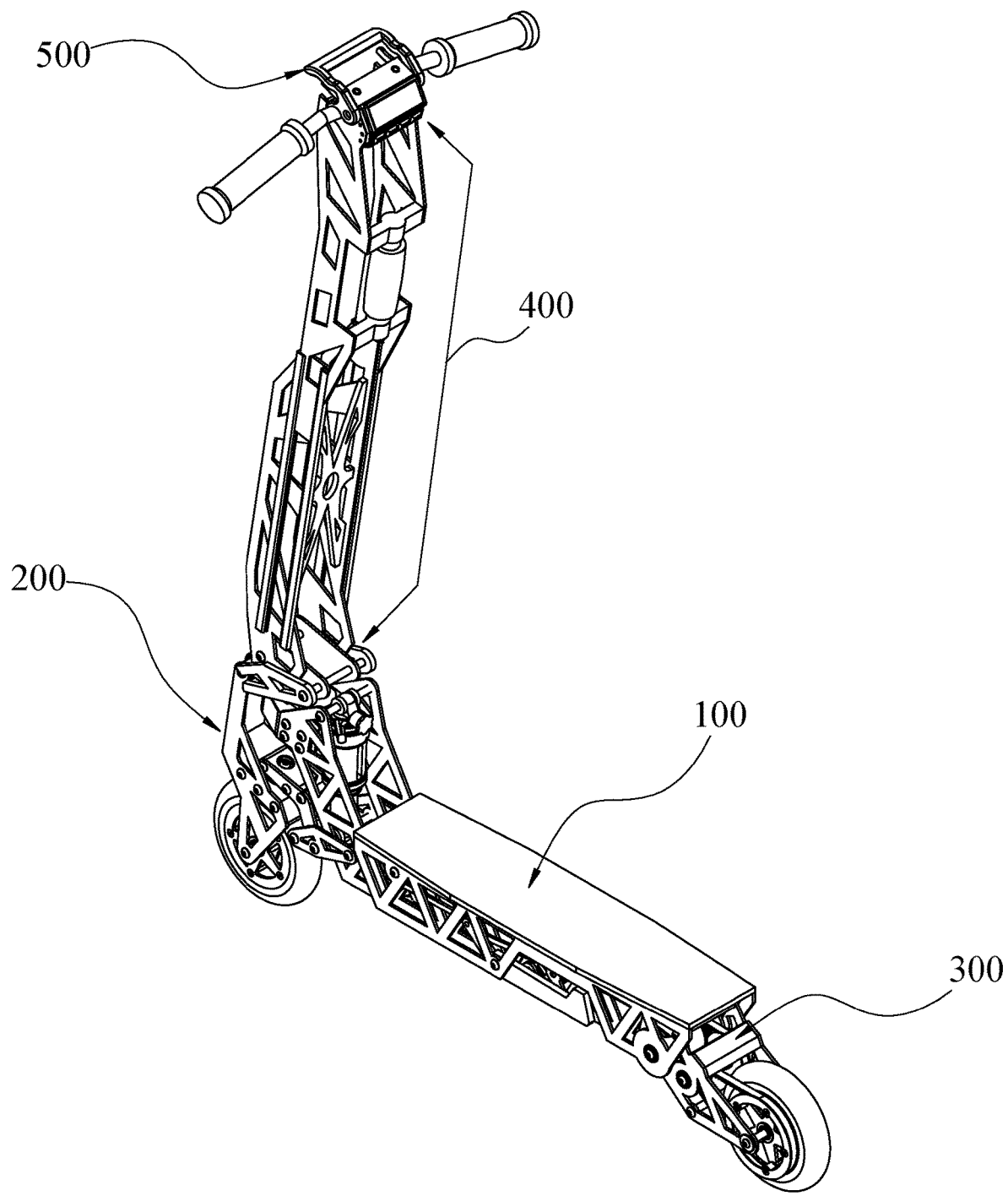
FIG. 18 is a perspective view of the electric scooter in accordance with a preferred embodiment of the present invention showing a telescoping plate assembly as shown in FIG. 3.

FIG. 1 is a perspective view of the folding electric scooter 1000 in the open position according to an embodiment of the present invention. The electric scooter 1000 is in this example a folding electric scooter that is produced commercially for the consumer market. As shown in FIG. 2, FIG. 3 and FIG. 18, the electric scooter 1000 comprises a main body assembly 100, a front fork assembly 200 located at the front end of the main body assembly 100, a rear fork assembly 300 located at the rear end of the main body assembly 100, a telescoping plate assembly 400 located on top of the front fork assembly 200 and a handlebar assembly 500 located on top of the telescoping plate assembly 400.

Figure 3A:
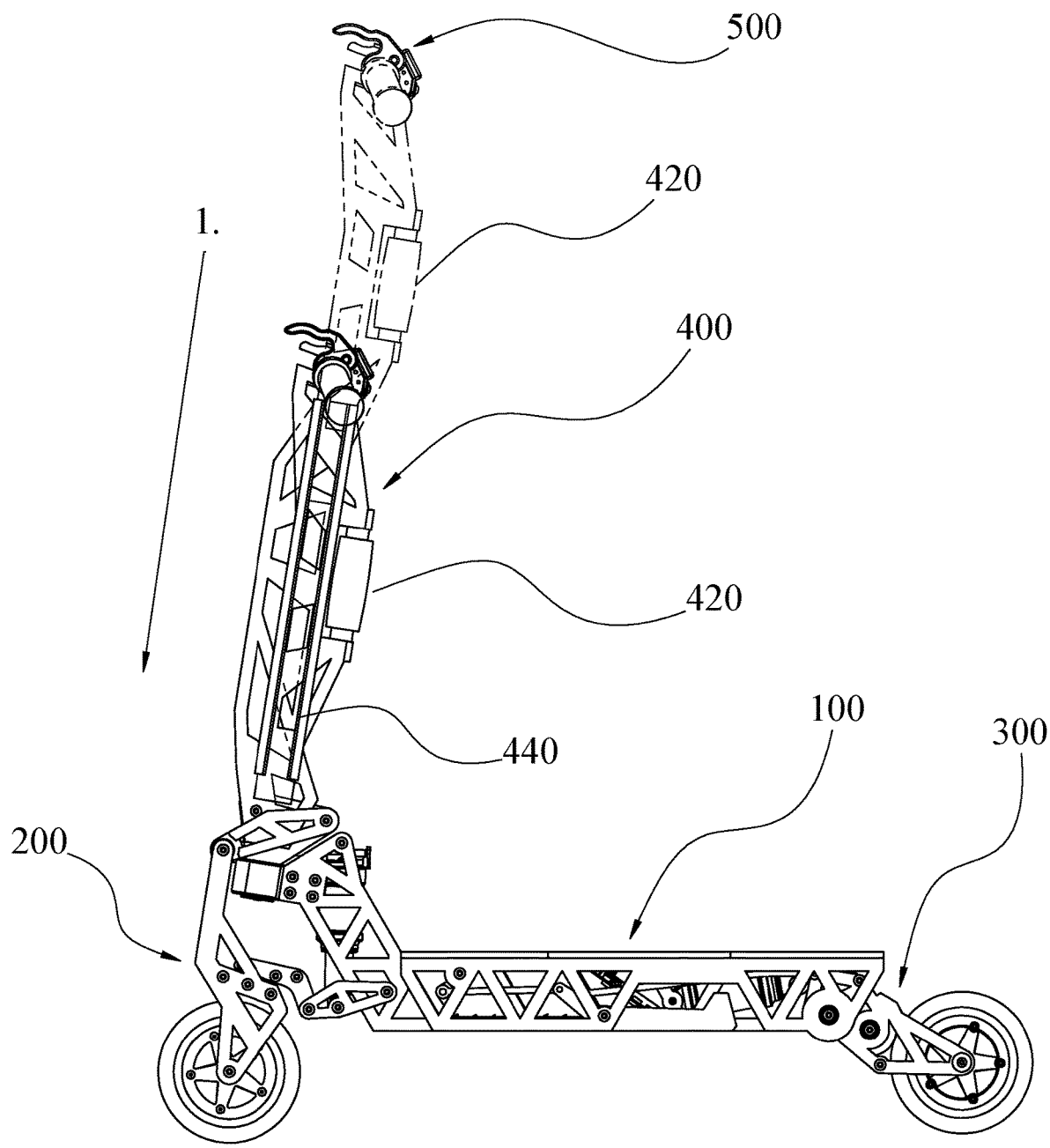
FIGS. 3a-3e illustrate views of the electric scooter according to an embodiment of the present invention showing different stages of the electric scooter being moved between an open position as illustrated in FIG. 1 to a closed position as illustrated in FIG. 4.
Figure 3B:
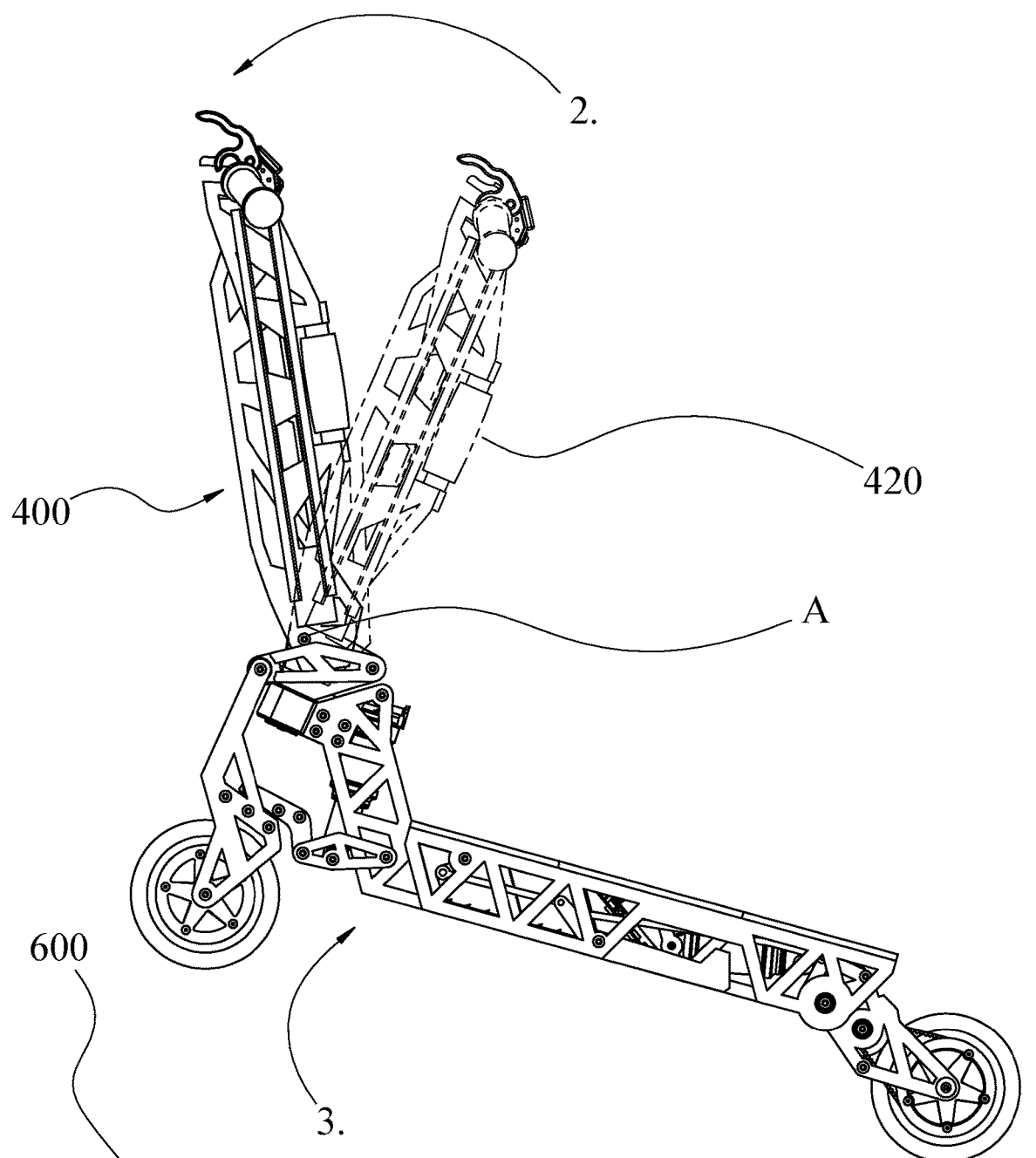
Figure 3C:
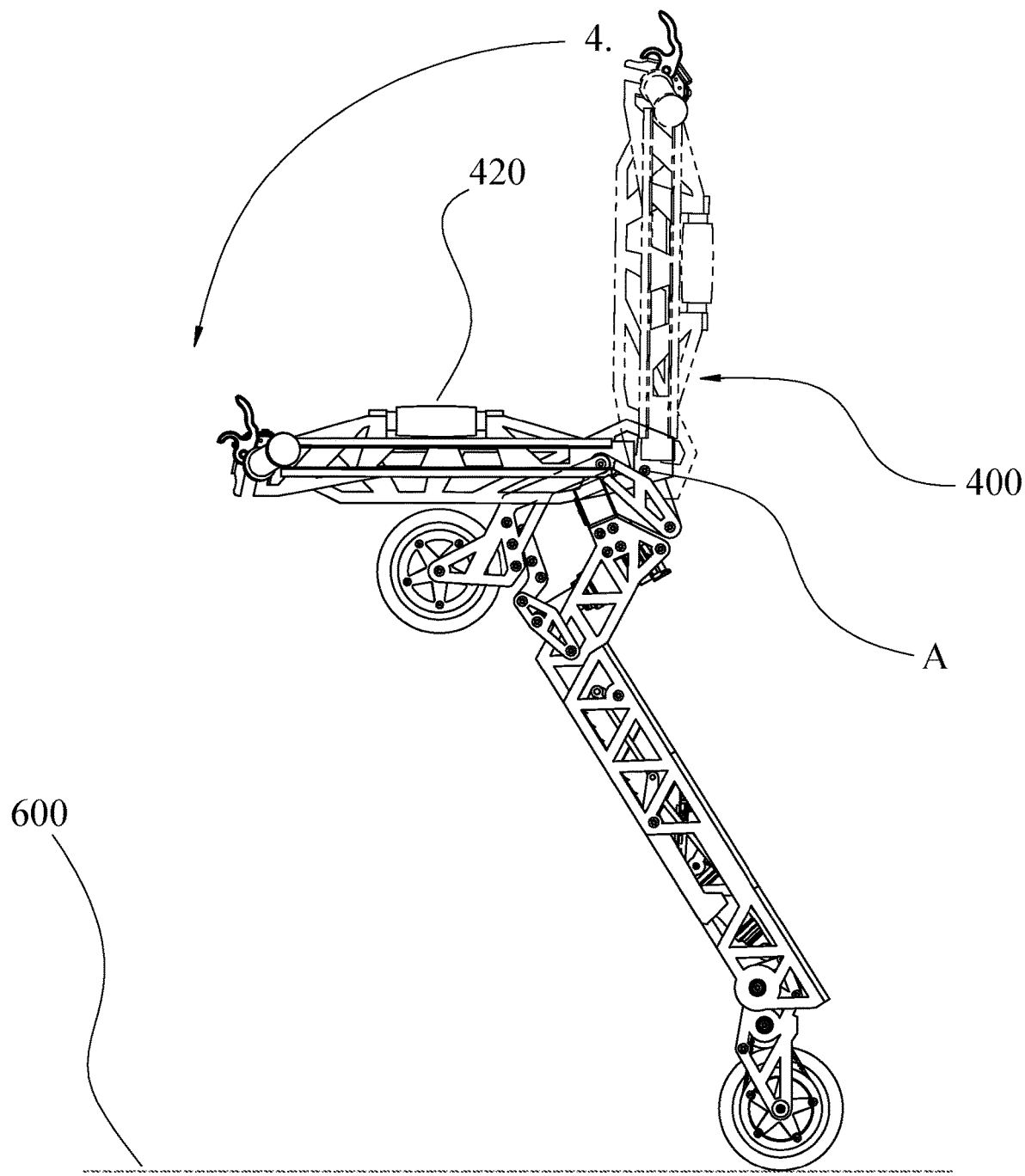
Figure 3D:
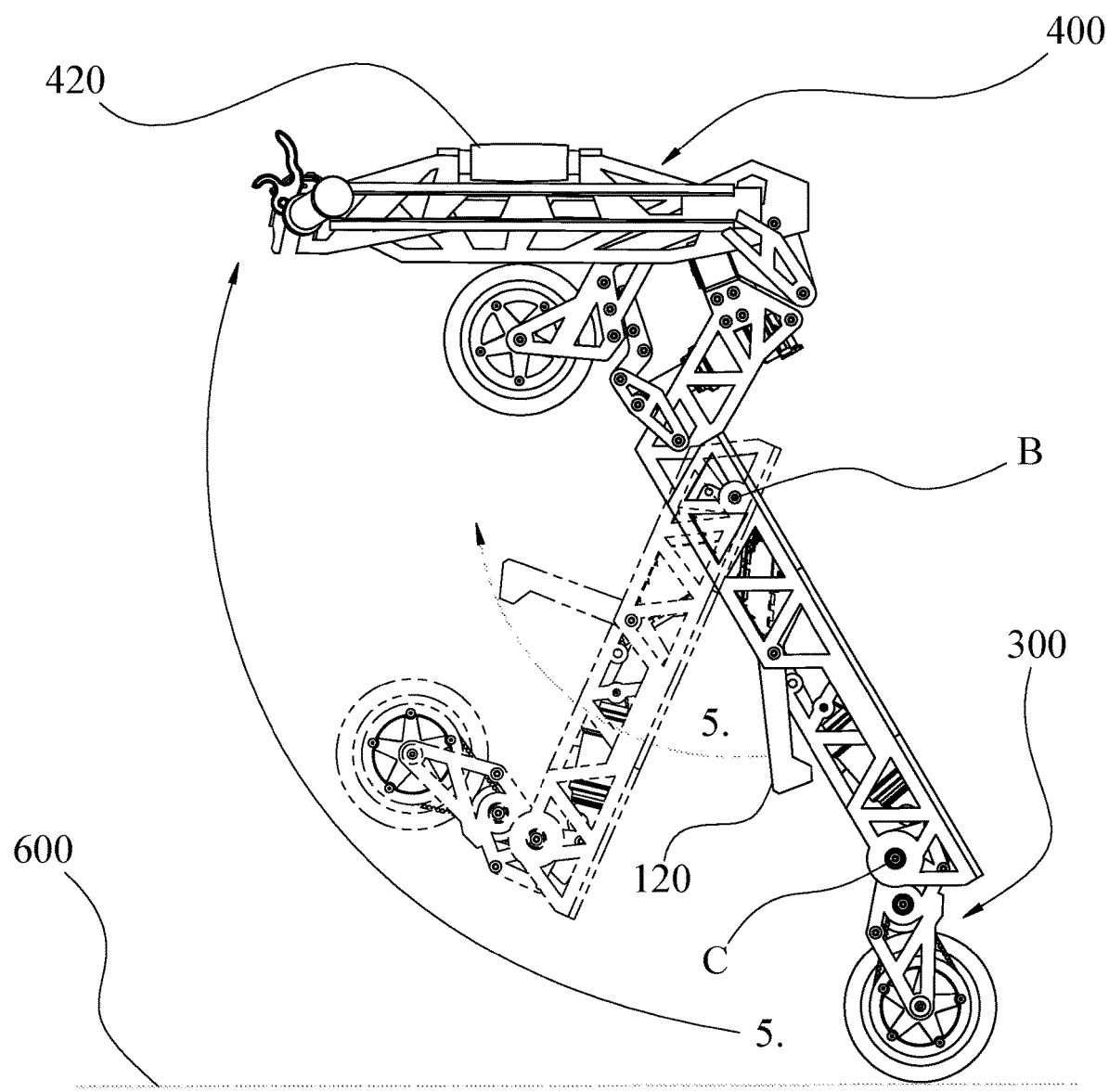
Figure 3E:
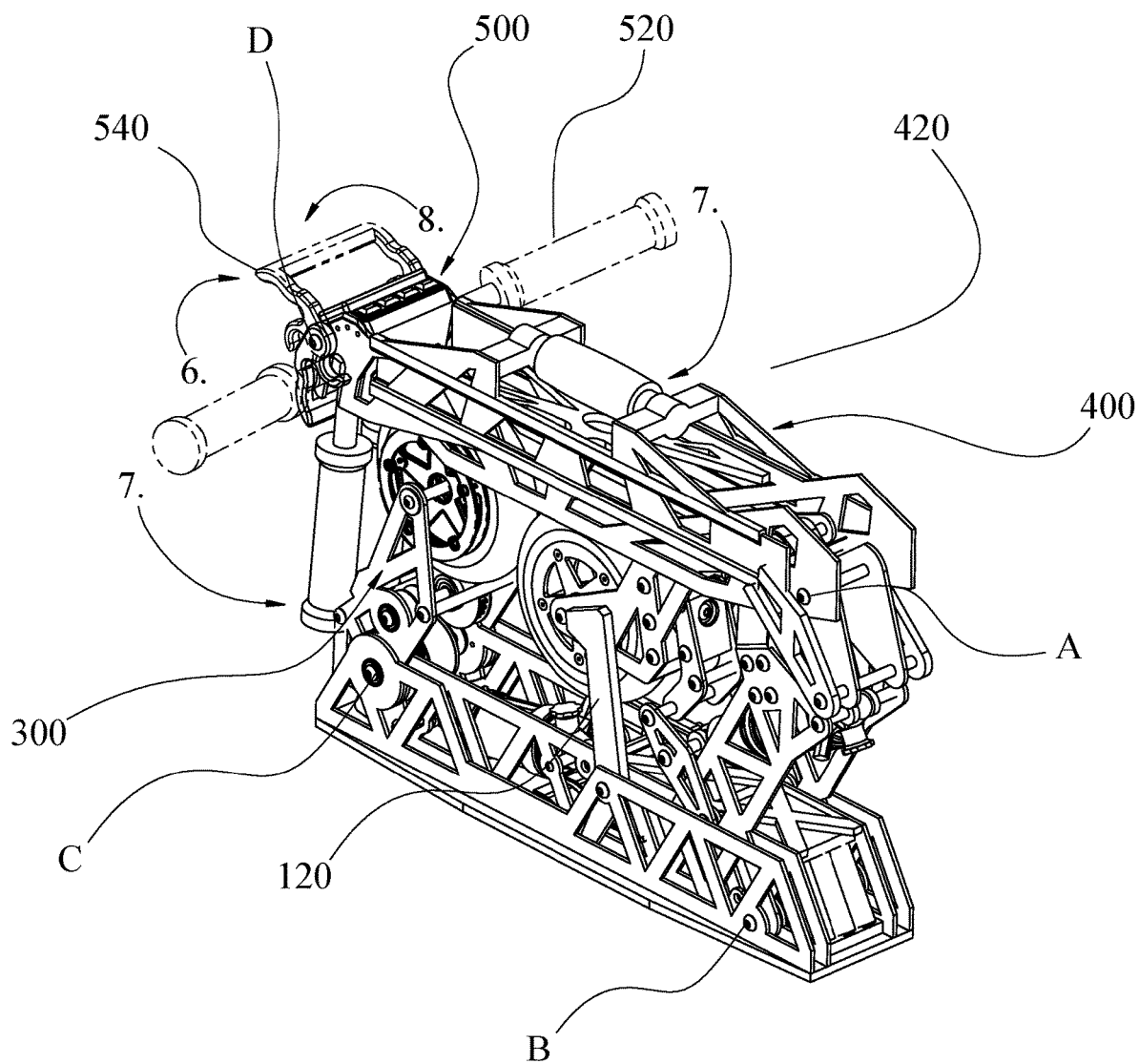
Figure 4:
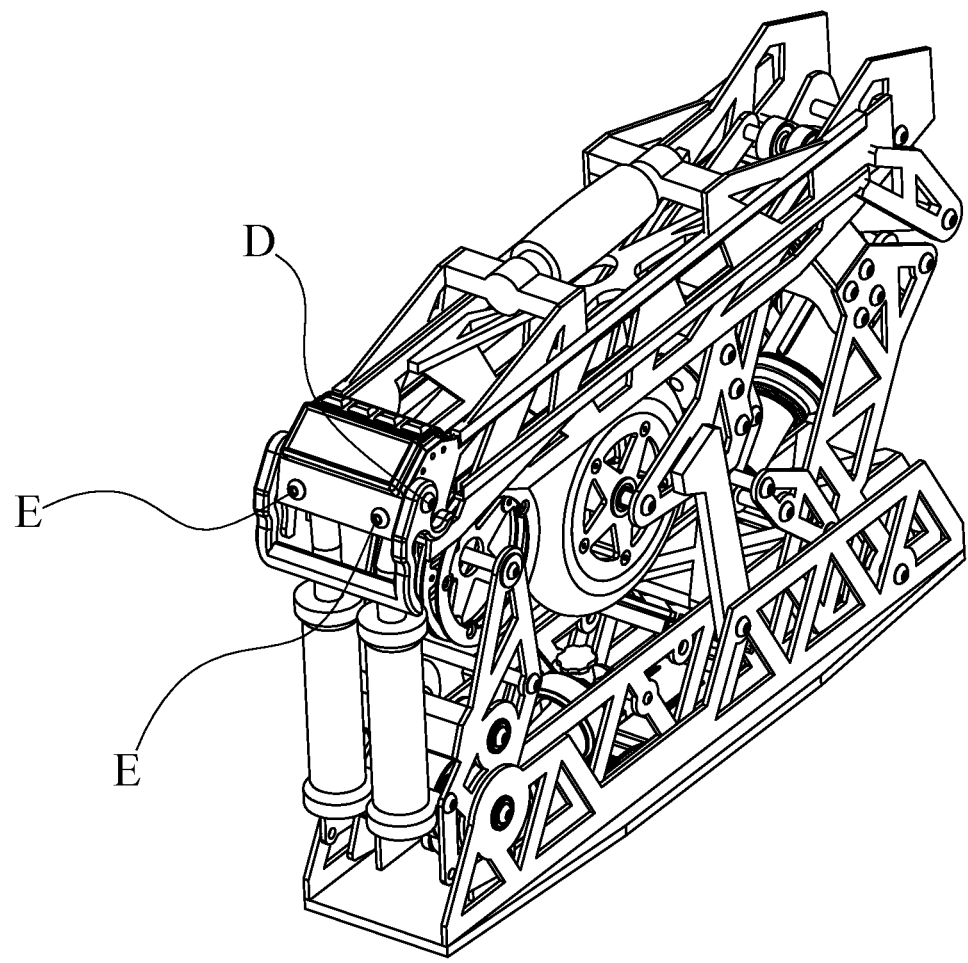
FIG. 4 is a perspective view of the electric scooter in the closed position in accordance with a preferred embodiment of the present invention.
Figure 4A:
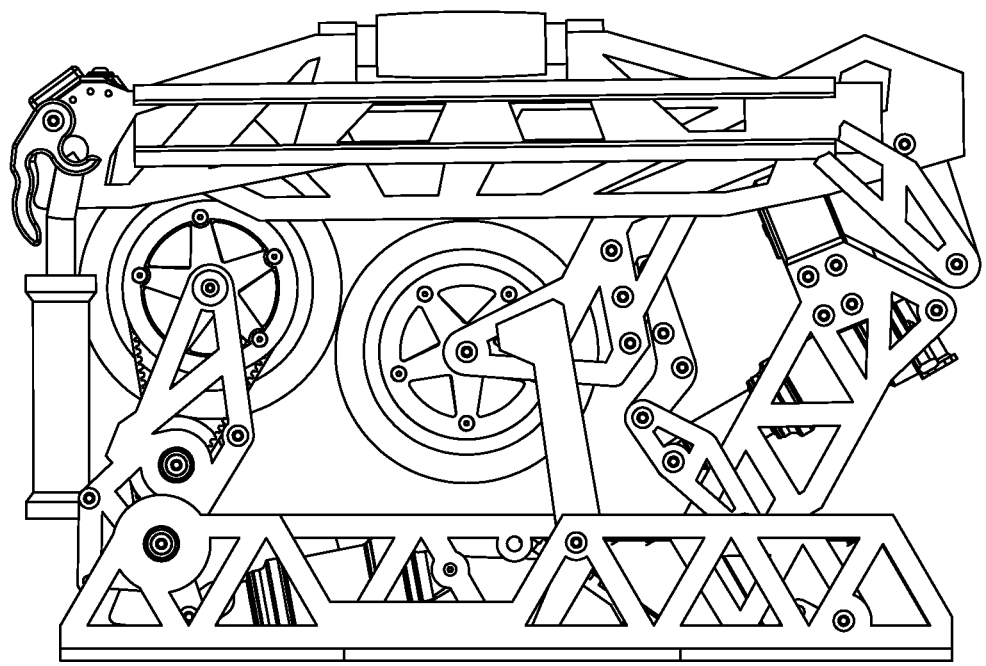
FIG. 4a is a side view of the electric scooter in the closed position in accordance with a preferred embodiment of the present invention.

FIG. 3a to FIG. 4 shows the folding procedure of the electric scooter. That is, FIG. 3a to FIG. 4 illustrates how the electric scooter in folded compactly from an open position (i.e. the position a user will ride the scooter) to a closed position (i.e. a position which the scooter is compactly folded and can be carried and/or inserted into a carrying device/apparatus to be transported). While holding the upper telescoping plate handle 420, push down on telescoping plate assembly 400 and along direction 1. towards the front fork assembly 200 as shown in FIG. 3a. While holding the upper telescoping plate handle 420, lift up the front fork assembly 200 along direction 3. off the ground 600 and rotate the now collapsed telescoping plate assembly 400 along direction 2. towards the front fork assembly 200. The telescoping plate assembly 400 will rotate about pivot A as shown in FIG. 3b. The telescoping plate assembly 400 will come together with the front fork assembly 200 along direction 4. as shown in FIG. 3c. While holding the upper telescoping plate handle 420, pull on the main body handle 120 to lift the main body assembly 100 and the rear fork assembly 300 off the ground 600 along direction 5. towards the front fork assembly 200. The main body assembly 100 will rotate about pivot B towards the front fork assembly 200, and the rear fork assembly 300 will rotate about pivot C toward the main body assembly 100 as shown in FIG. 3*d*. While holding the upper telescoping plate handle 420, pull up on the handlebar grip latch 540 along direction 6. to unlock and collapse the handlebar grips 520 along direction 7. towards the rear fork assembly 300. Then push back down on the handlebar grip latch 540 along direction 8. to lock the handlebar grips 520 in place. The handlebar grip latch 540, will rotate about pivot D as shown in FIG. 3*e*. The handlebar grips 520 will rotate about pivot E as shown in FIG. 4. FIG. 4*a* is a side view of the electric scooter in the closed position according to an embodiment of the present invention. The unfolding of the electric scooter is the reverse steps of the folding procedure.

Figure 5:
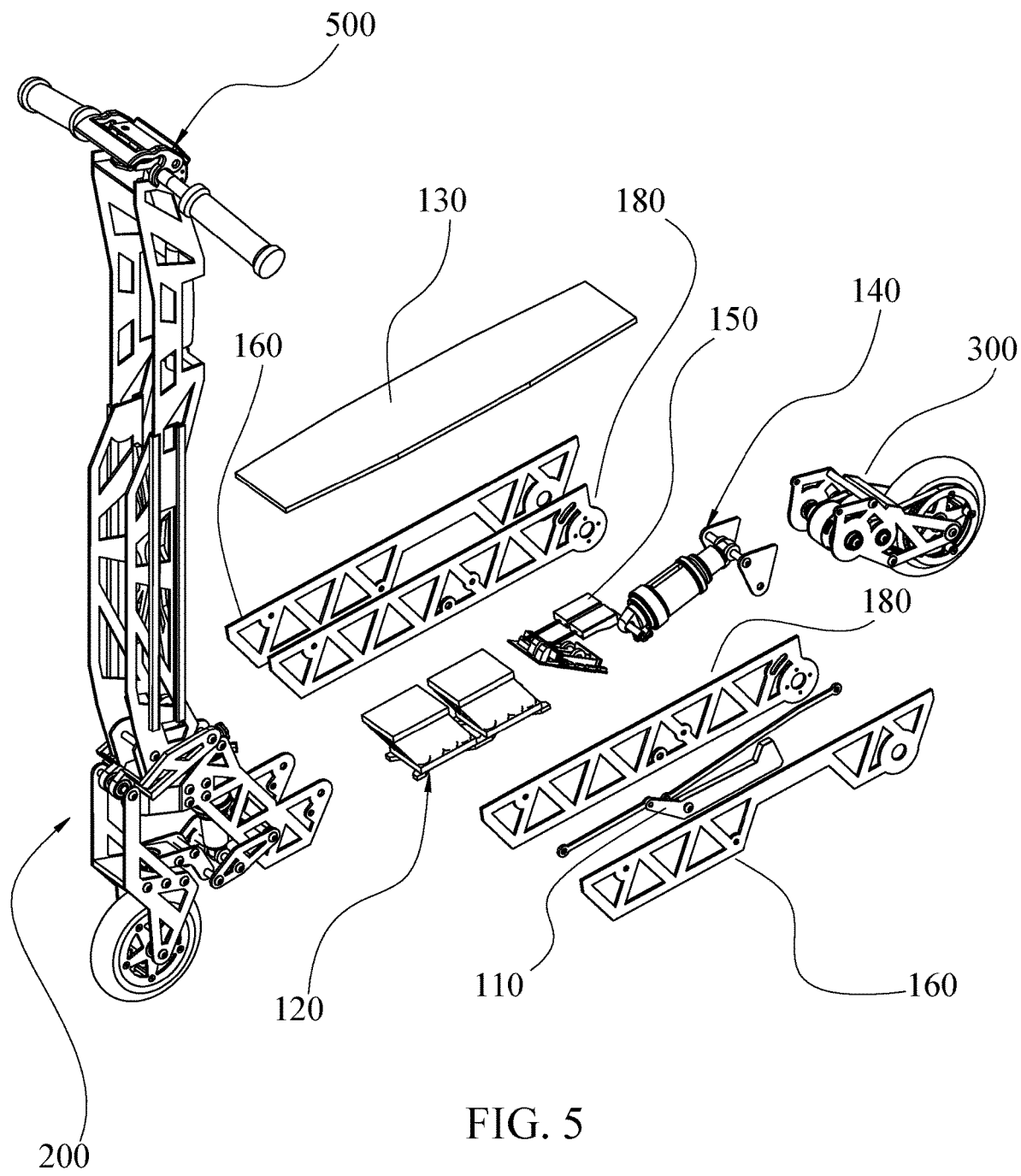
FIG. 5 is an exploded perspective view of the main body assembly in accordance with a preferred embodiment of the present invention as shown in FIG. 2.

As shown in FIG. 5, the main body assembly 100 comprises outer main body plates 160, inner main body plates 180, a battery pack assembly 120 located at the front of the main body assembly 100, an electronics housing assembly 150 located in the middle of the main body assembly 100, a rear suspension assembly 140 located at the rear of the main body assembly 100, a main body handle 110.

Figure 6:
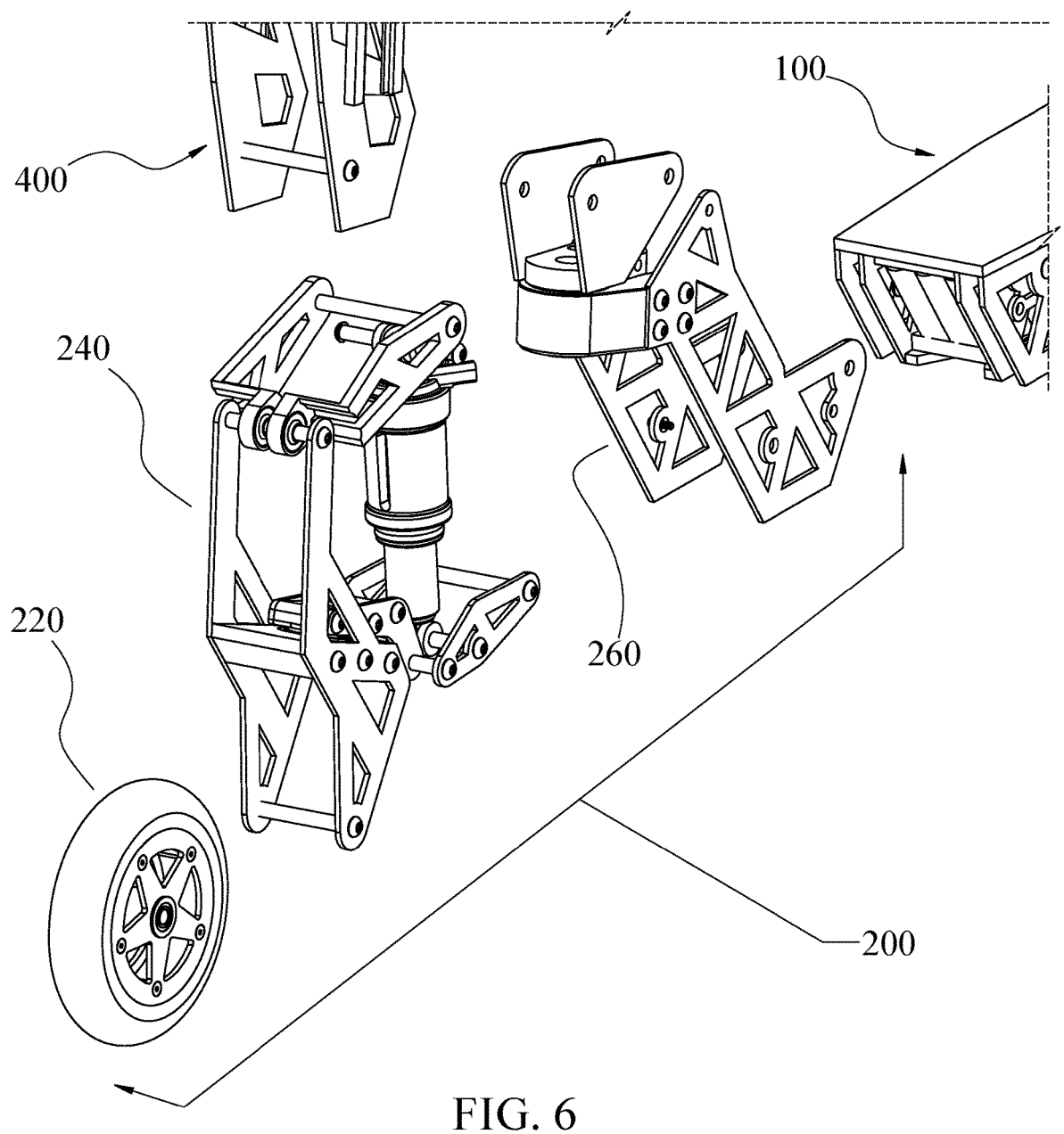
FIG. 6 is a partially exploded, perspective view of a front fork assembly in accordance with a preferred embodiment of the present invention as shown in FIG. 2.

As shown in FIG. 6, the front fork assembly 200 comprises of a front wheel assembly 220 located at the front of the front fork assembly 200, a front suspension assembly 240, located in the middle of the front fork assembly 200, and a gooseneck assembly 260 located at the rear of the front fork assembly 200.

Figure 7:
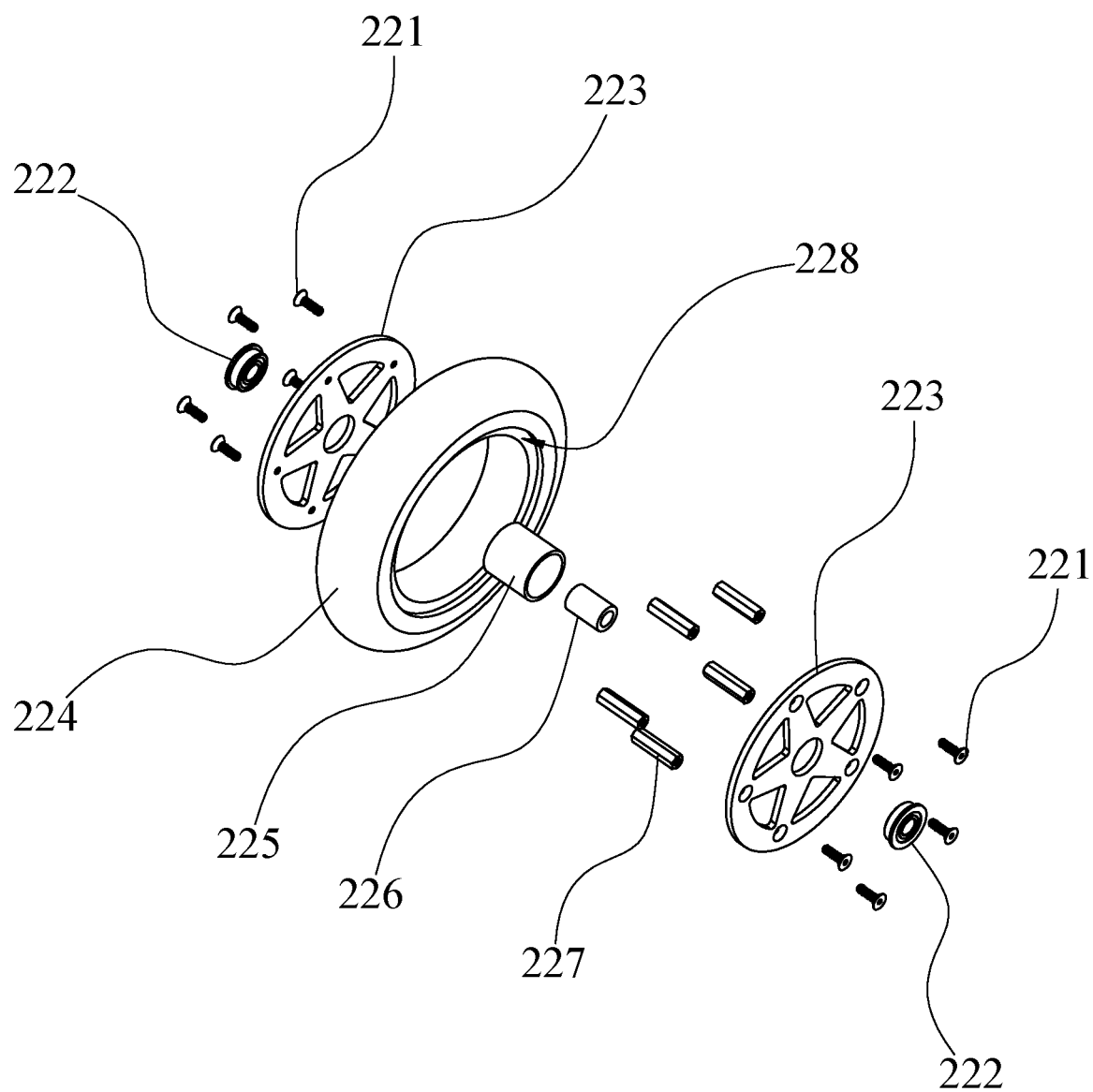
FIG. 7 is an exploded perspective view of a front wheel assembly in accordance with a preferred embodiment of the present invention as shown in FIG. 6.

As shown in FIG. 6 and FIG. 7, the front wheel 220, comprises a solid rubber tire 224 having at least one groove 228, two outside wheel plates 223, standoff hex nuts 227, inner flanged ball bearing spacer 226, inner outside wheel plate spacer 225, flanged ball bearing 222, and screws 221. The front wheel is assembled together by attaching the two outside wheel plates 223 in the at least one groove 228, to the standoff hex nuts 227, and the inner flanged ball bearing spacer 226, and the inner outside wheel plate spacer 225. Then the screws 221 fasten the assembled together parts to form the wheel as shown in FIG. 6.

Figure 8:
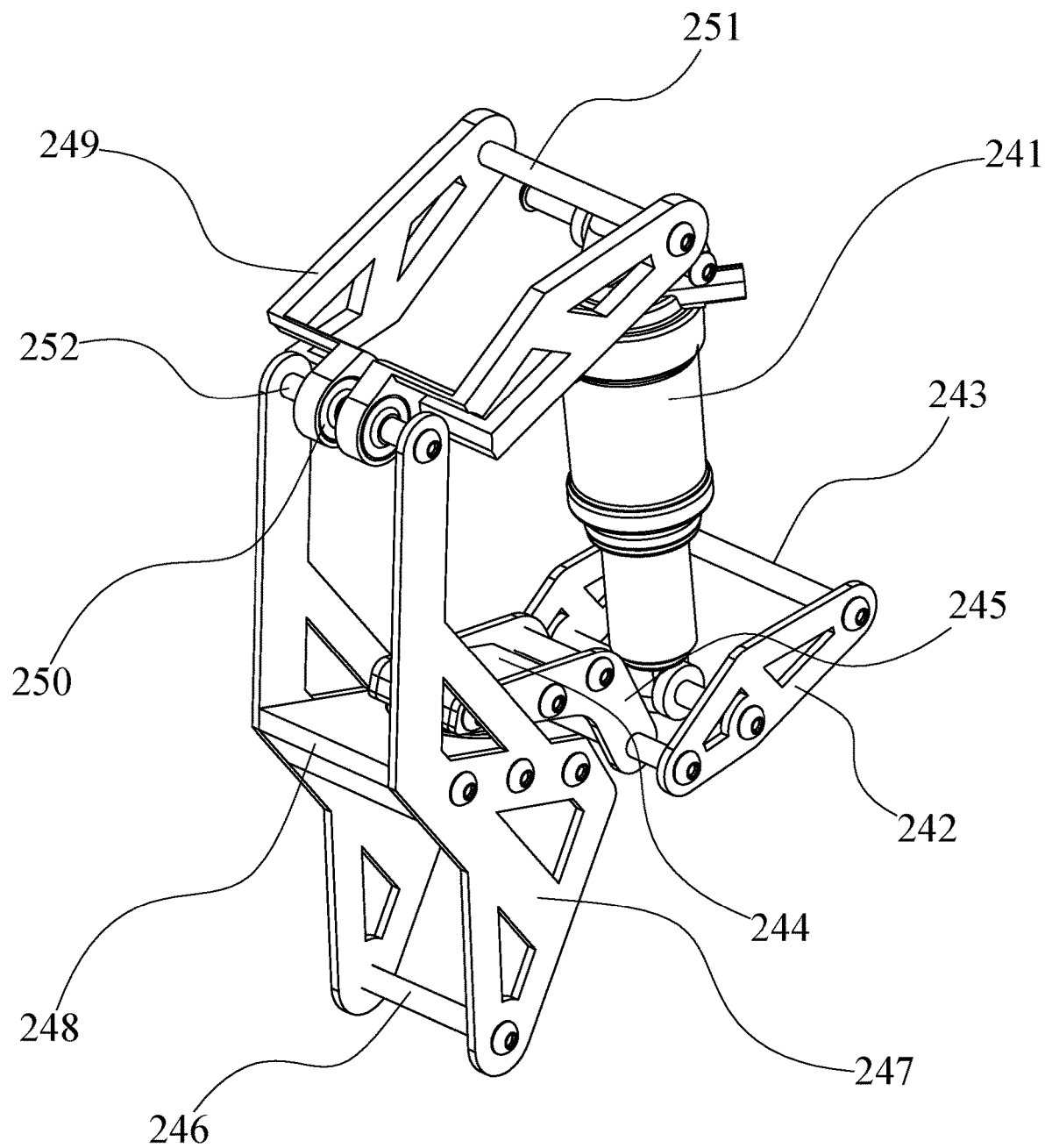
FIG. 8 is a perspective view of a front suspension assembly in accordance with a preferred embodiment of the present invention as shown in FIG. 6.

As shown in FIG. 8, the front suspension assembly 240, comprises two front forks 247, lower headset housing crossmember 248, lower steering knuckle 244, front wheel axle 246, upper front fork rod 252, lower steering knuckle outer plates 245, lower suspension rocker plates 242, at least one front air shock canister 241, lower suspension rocker plate rod 243, upper suspension independent control arms 249, upper suspension independent control arm ball joint linkage 250 and upper suspension independent control arm rod 251. The air shock canister 241 is adjustable for adjusting the ride of the user and rebound tweaking abilities.

Figure 9:
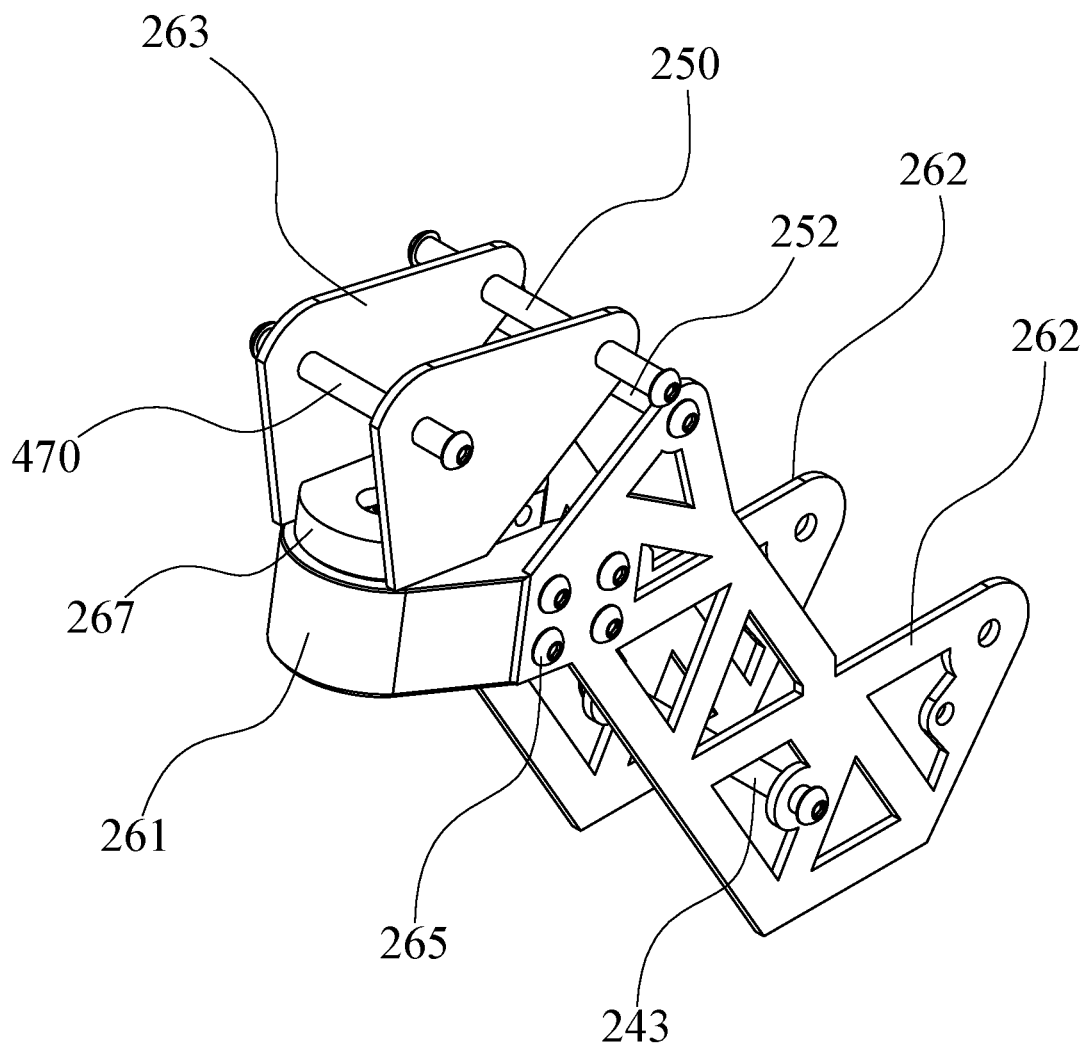
FIG. 9 is a partial perspective view of the electric scooter in accordance with a preferred embodiment of the present invention showing a goose neck assembly as shown in FIG. 6.
Figure 11:
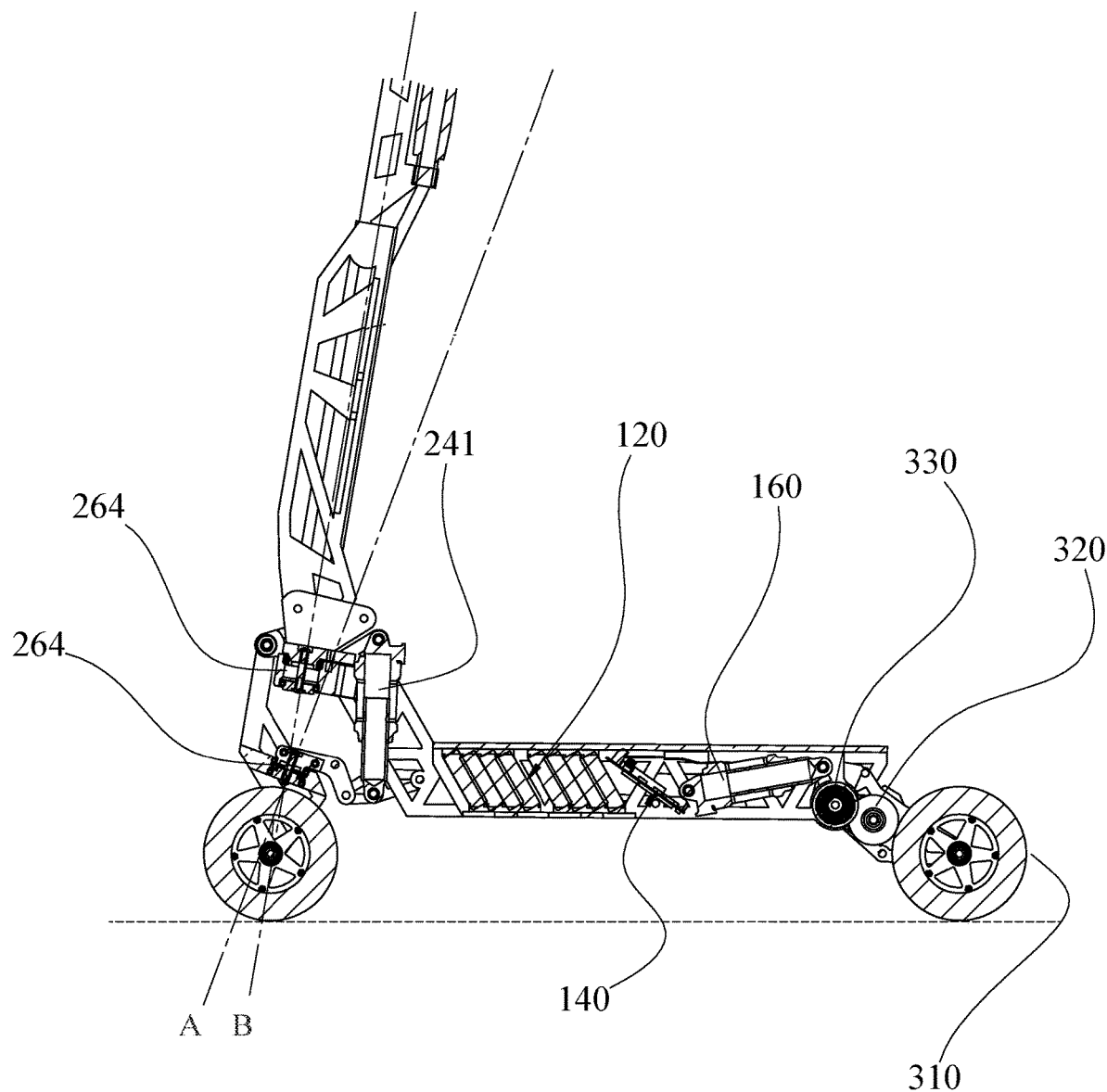
FIG. 11 is a cross sectional side view of the electric scooter according to an embodiment of the present invention illustrating multiple components within the scooter as shown in FIG. 3.

As shown in FIG. 9, the gooseneck assembly 260 comprises outer gooseneck plates 262, upper headset housing 261, upper steering knuckle 267, upper steering knuckle plates 263 and screws 265. The gooseneck assembly 260 has two headset ball bearings 264 located inside the upper headset housing 261 as shown in FIG. 11.

Figure 10:
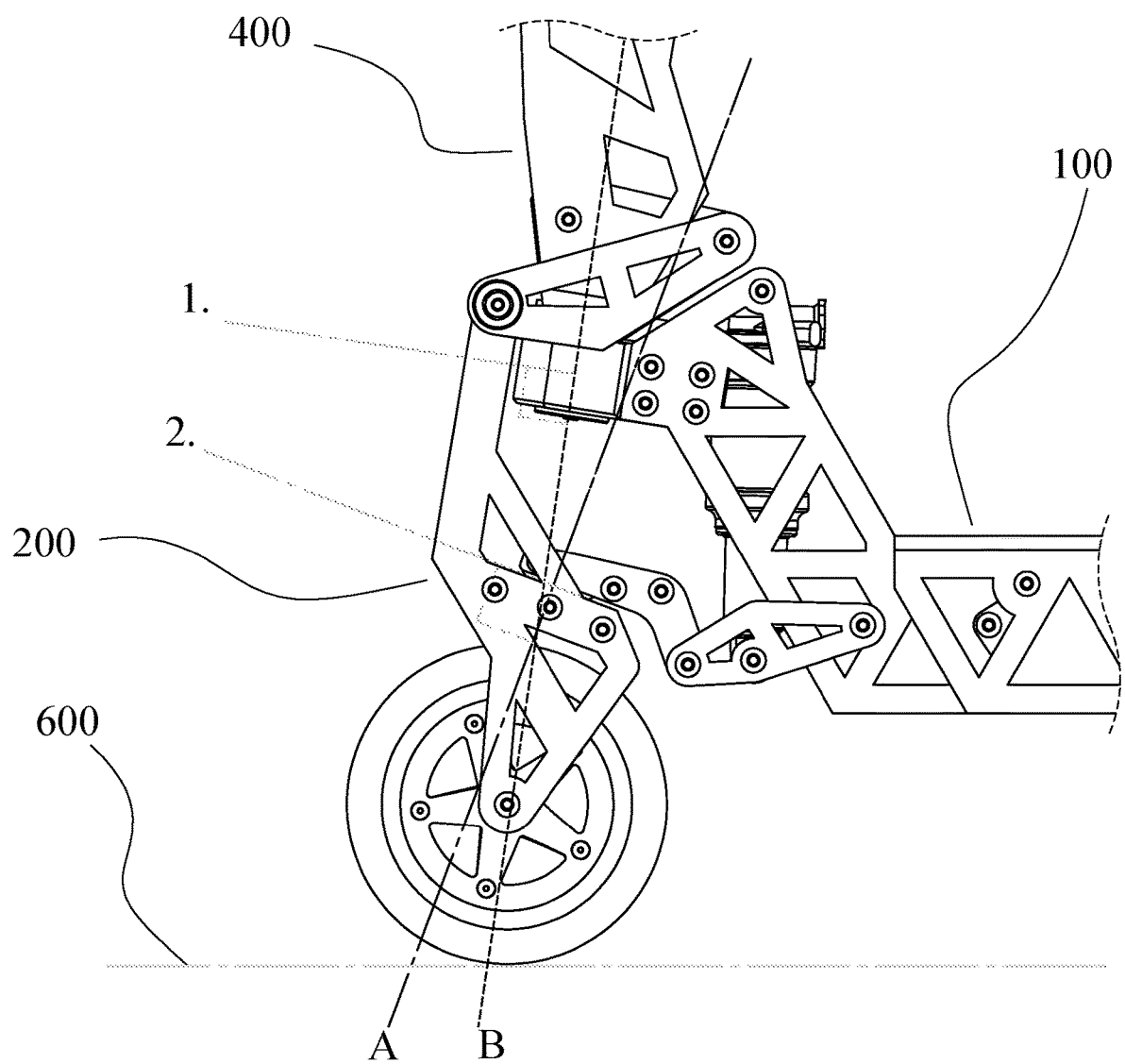
FIG. 10 illustrates a partial side view of the front fork assembly according to an embodiment of the present invention showing an increased rake angle of upper and lower headsets of the front suspension assembly as shown in FIG. 6.
Figure 12:
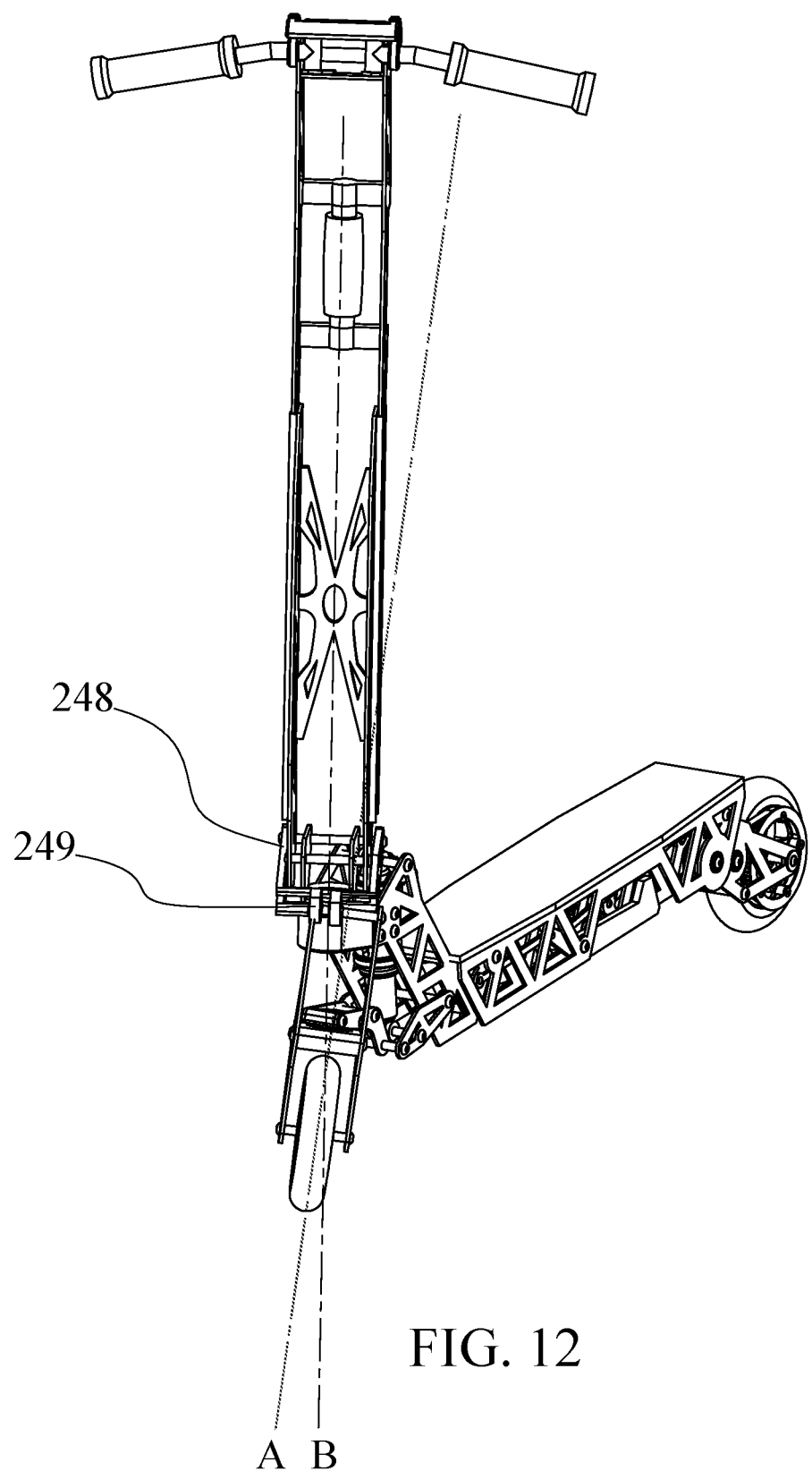
FIG. 12 illustrates a front perspective view of the front fork assembly according to an embodiment of the present invention illustrating the varying inclination of the front wheel to lean in the direction of a turn.
Figure 13:
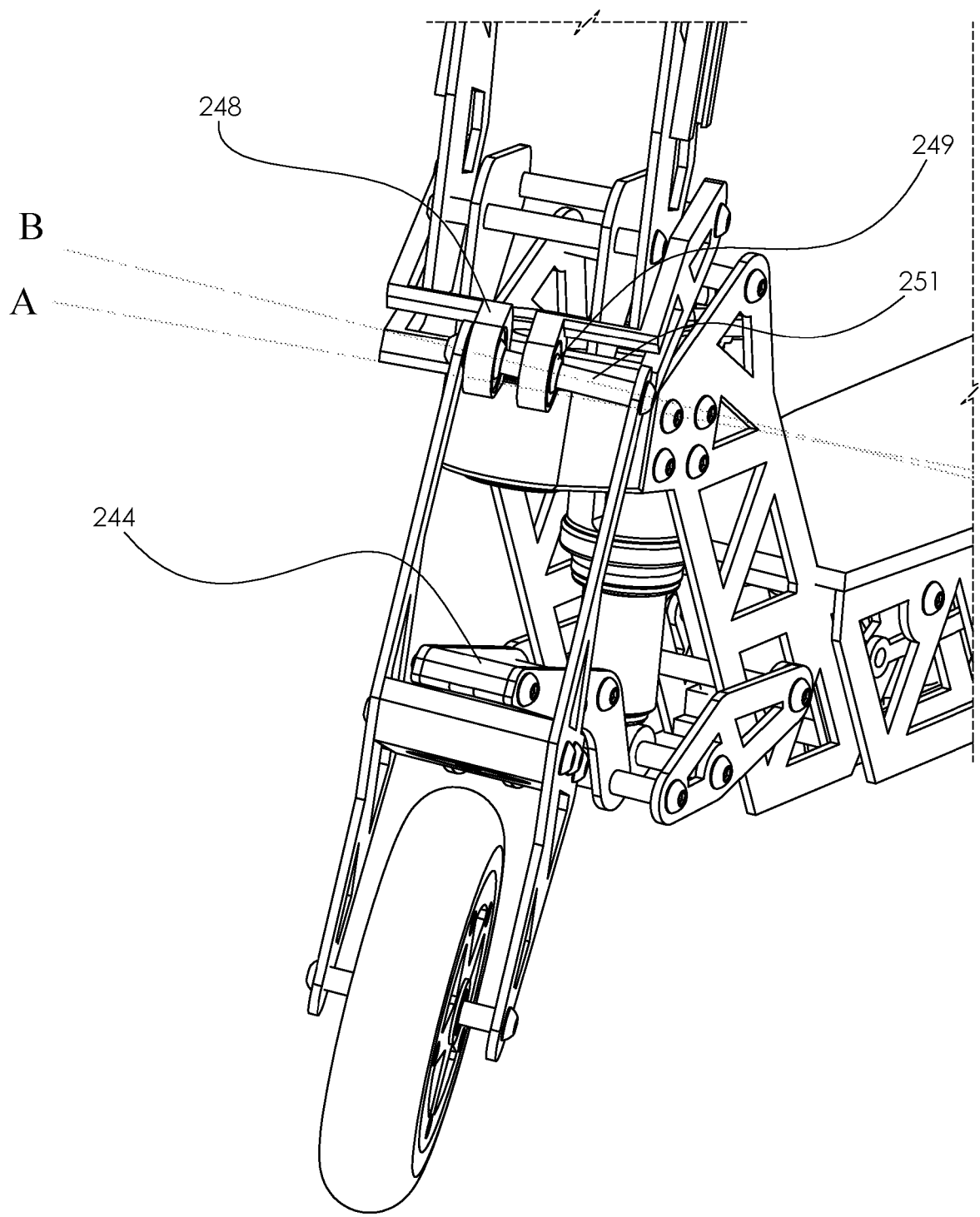
FIG. 13 is a close-up partial perspective view of the front fork assembly in accordance with a preferred embodiment of the present invention as shown in FIG. 12.

FIG. 10. FIG. 12 and FIG. 13 is a partial side view of the front fork assembly 200 according to an embodiment of the present invention illustrating the double headset housing design 1. and 2.

The problem with a single rake angle of a typical/conventional electric scooter is that the rake angle is almost normal (i.e. perpendicular) to the ground which creates a very unstable scooter while riding and turning the scooter because the conventional scooters' center of gravity is vertical very high from the ground due to the nature of conventional electric scooters design and the person standing on the conventional scooters' platform places the center of gravity of the scooter very high and therefore makes the steering characteristics of the steering unstable because of the steep rake/rake angle. Rake/Rake angle is the angle of a scooters' steering head of the frame.

As shown in FIG. 10, the disclosed scooter 1000 has a double headset design 1 and 2 that increases the rake angle A for more steering stability while still keeping the steering upright B for an upright holding of the handlebars.

The disclosed scooter 1000 design has solved the single or steep rank angle in scooters by having a design of a double headset suspension which allows the scooter 1000 to obtain variable rake angles as the scooter 1000 goes through its suspension travel by comprising lower headset housing crossmember 248, upper suspension independent control arms 249 and upper suspension independent control arm rod 251 and therefore obtains an optimal trail in the range of 0.2 inches to 6 inches making the scooter easy to turn and the scooter stable. The scooter 1000 can have/obtain any rake angle in the range of zero degrees to thirteen degrees.

Trail is measured in distance between the point of the front wheel's contact with the ground to where the steering axis intersects the ground.

Therefore, the double headset suspension which allows the scooter 1000 to obtain variable rake angles as the scooter 1000 goes through its suspension travel by comprising independent steering members of lower headset housing crossmember 248, upper suspension independent control arms 249 and upper suspension independent control arm rod 251 has solve the problem of an unstable scooter which results in a plurality of scooter accidents due to conventional scooters having a steep rake angle which results in less stability due to a higher and more forward center of mass.

FIG. 11 is a cross sectional side view of the electric scooter 1000 according to an embodiment of the present invention illustrating the components within the scooter as shown in FIG. 3.

Figure 14:
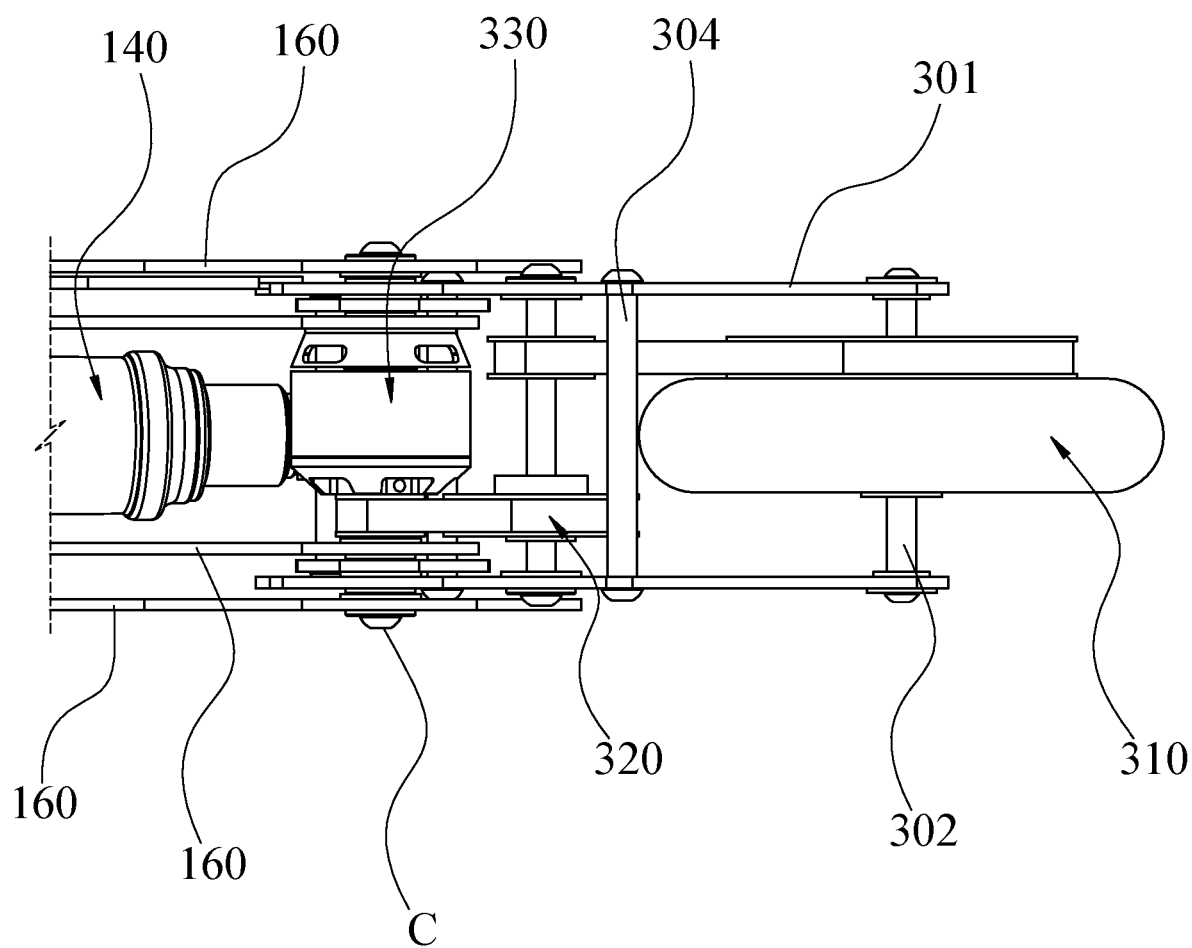
FIG. 14 is a partial bottom view of the rear end assembly in accordance with a preferred embodiment of the present invention illustrating the drive train components.
Figure 15:
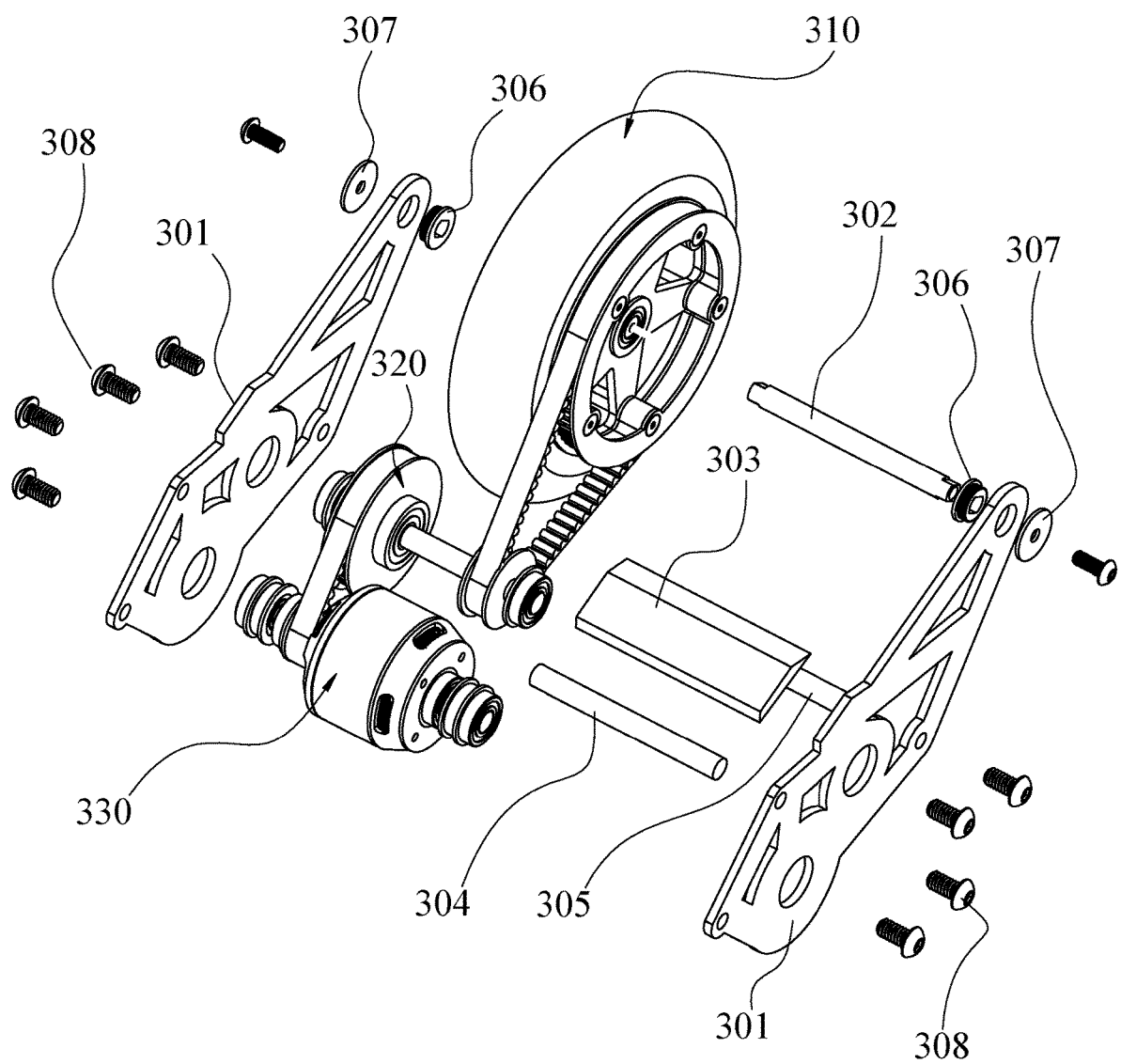
FIG. 15 is an exploded perspective view of the rear end assembly in accordance with a preferred embodiment of the present invention as shown in FIG. 3.

As shown in FIG. 11, FIG. 14, and FIG. 15, the rear fork assembly 300 comprises a rear wheel assembly 310, a gear differential assembly 320, a brushless outrunner electric motor assembly 330, two rear fork plates 301, a rear wheel axle 302, axle bushings 306, axle bushing spacers 307, rear air shock canister push rod 304, upper crossmember 303, lower crossmember rod 305 and screws 308 as shown in FIG. 15. At least one rear air shock canister is adjustable for adjusting the ride of the user and for rebound tweaking abilities.

Figure 16:
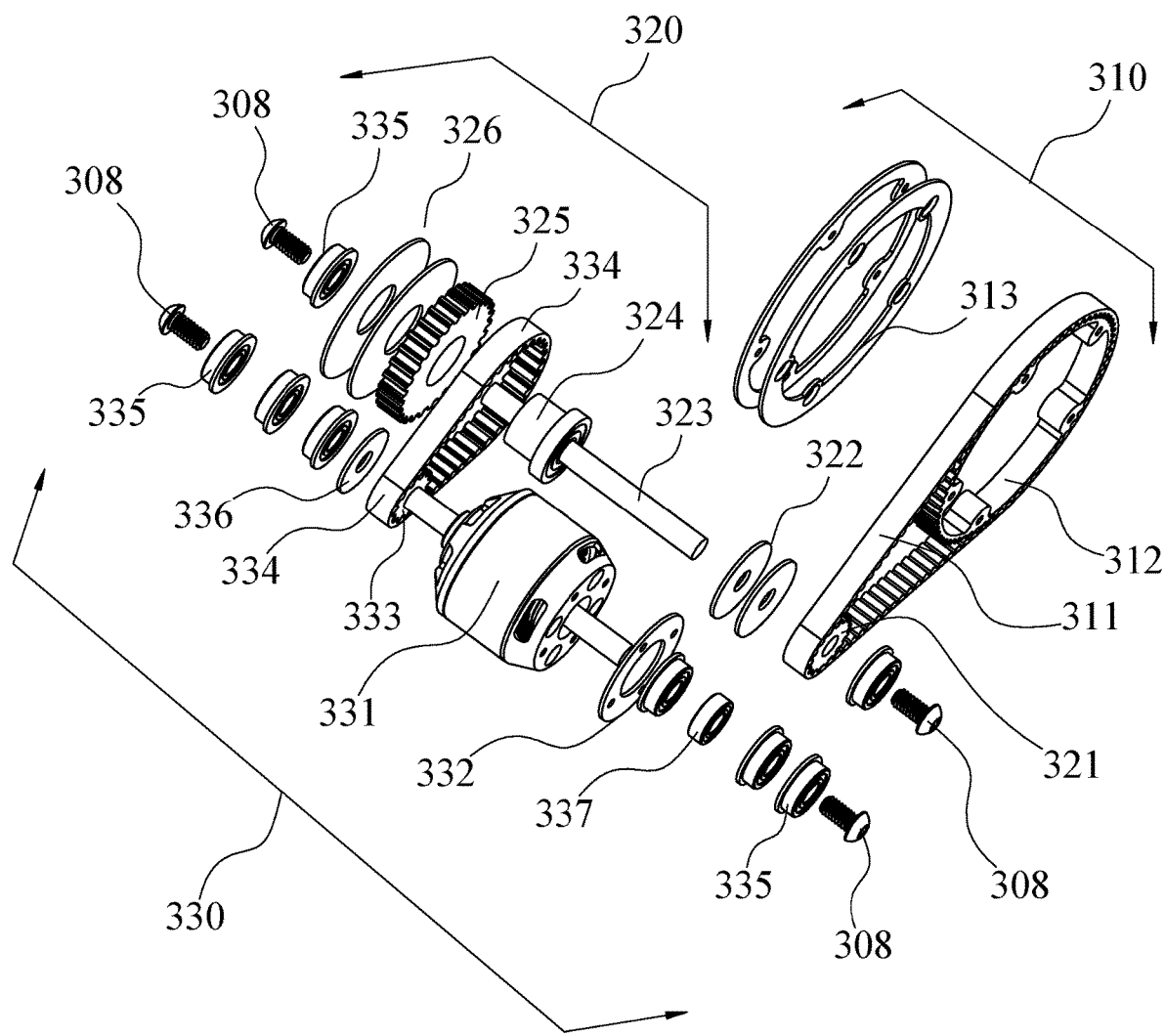
FIG. 16 is an exploded perspective view of a drivetrain assembly in accordance with a preferred embodiment of the present invention as shown in FIG. 15.

As shown in FIG. 16, the brushless outrunner electric motor assembly 330 comprises a brushless outrunner electric motor 331, brushless outrunner electric motor mounting spacer 332, curved tooth pulley 333, curved tooth pulley spacer 336, curved tooth fiberglass reinforced rubber belt 334, flanged ball bearings 335, brushless outrunner electric motor bearing 337 and screws 308 as shown in FIG. 16. The gear differential assembly 320 comprises a large curved tooth pulley 325, large curved tooth pulley spacers 326, freewheel sprag clutch bearing 324, gear differential shaft 323, small curved tooth pulley 321, small curved tooth pulley spacers 322, flanged ball bearings 335, and screws 308 as shown in FIG. 16. The scooter has a rear differential which is a freewheel gear which means the gear only turns in one direction allowing the scooter to coast "freewheel" down hills in order to conserve battery power. The scooter 1000 can alternatively be made with a direct drive gear differential to utilize a regenerative braking option. The brushless outrunner electric motor 331 can be any size in order to provide the desired power or speed, depending on the size and weight of the scooter model.

Figure 17:
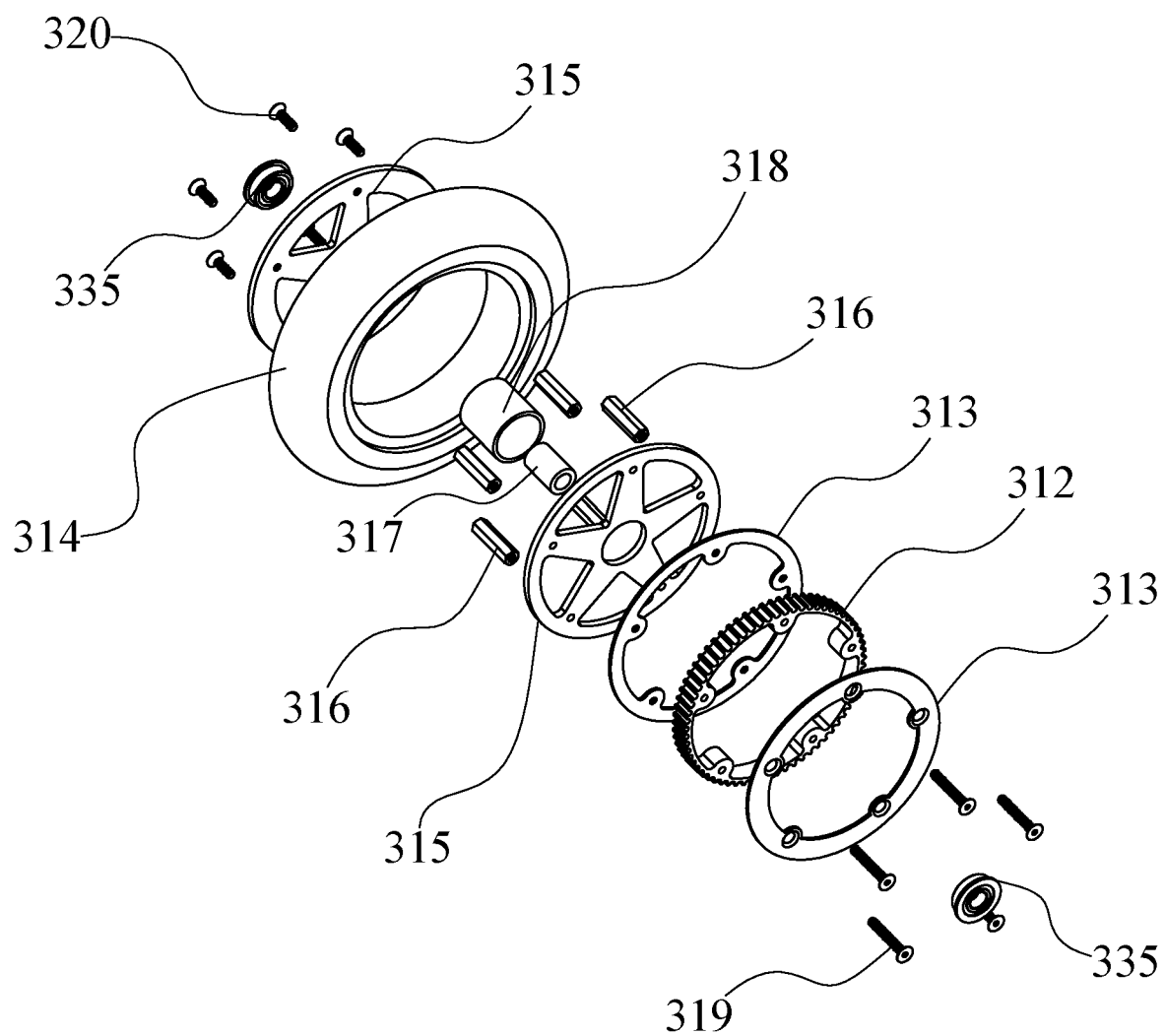
FIG. 17 is an exploded perspective view of the rear wheel assembly in accordance with a preferred embodiment of the present invention as shown in FIG. 15.

As shown in FIG. 17, the rear wheel assembly 310 comprises a curved tooth pulley 312, curved tooth pulley spacers 313, and a curved tooth fiberglass reinforced rubber belt 311, as shown in FIG. 16. The rear wheel assembly 310 preferably has a drivetrain ratio of has 7:1 but the drivetrain ratio can be as high as 18:1 and as low as 2:1 in gear reduction for increased torque.

As shown in FIG. 7 and FIG. 17, there is a solid rubber tire 314, two outside wheel plates 315, standoff hex nuts 316, inner flanged ball bearing spacer 317, inner wheel plate spacer 318, flanged ball bearings 335, wheel plate screws 320 and curved tooth pulley screws 319. Also, at least one groove 228 can be provided on the solid rubber tire 314 as shown in FIG. 7.

Figure 19:
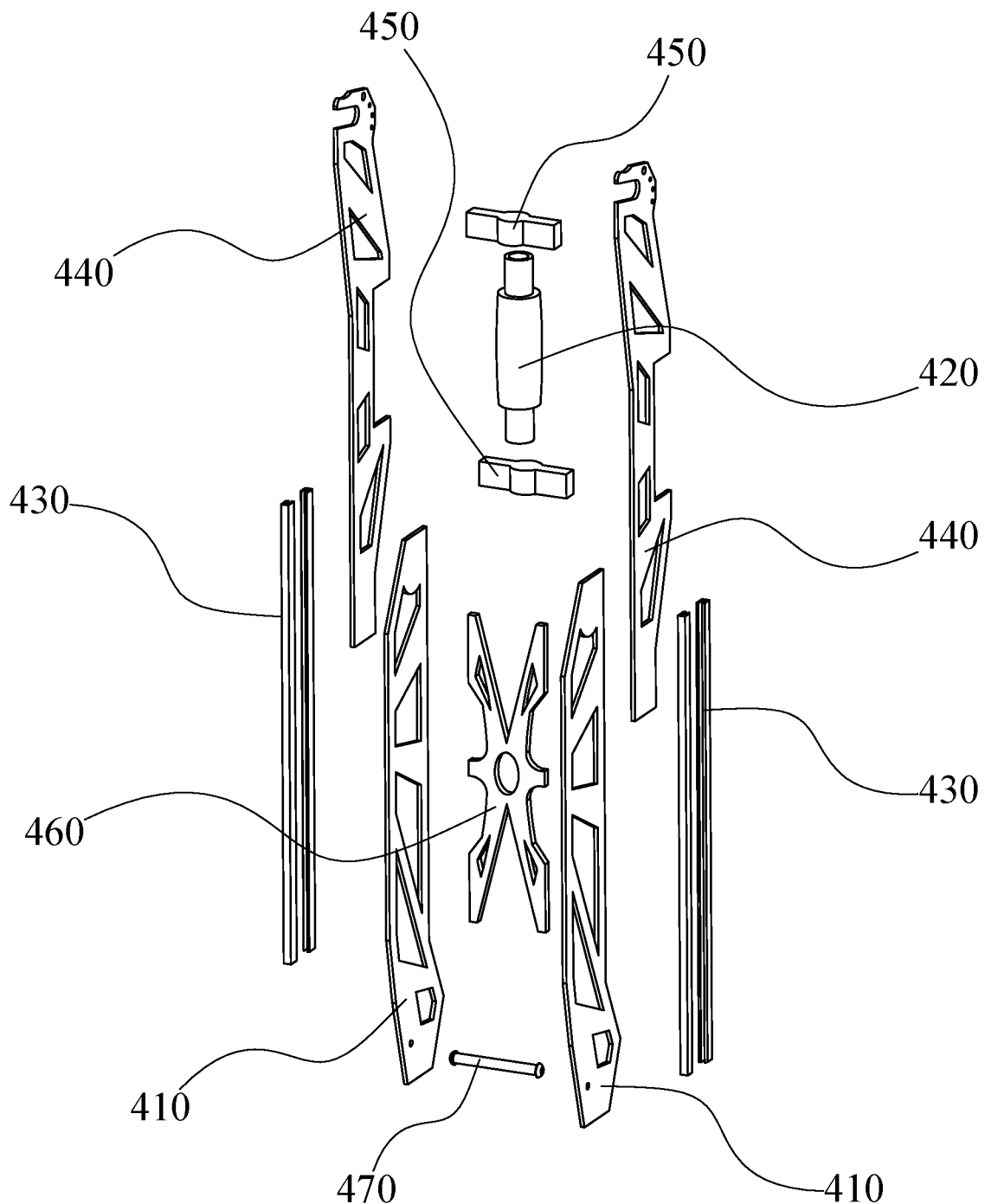
FIG. 19 is an exploded perspective view of the telescoping plate assembly in accordance with a preferred embodiment of the present invention as shown in FIG. 2.

As shown in FIG. 19, the telescoping plate assembly 400 comprises lower telescoping plates 410, lower telescoping plate crossmember 460, lower telescoping plate pivot rod 470, telescoping plate guide rails 430, upper telescoping plates 440, upper telescoping plate crossmembers 450, and an upper telescoping plate handle 420. The upper telescoping plates 440 slide down and within the telescoping plate guide rails 430 as shown in FIG. 3a in order to allow the scooter 1000 to fold into a compact folding unit as shown in FIG. 4a.

Figure 21:
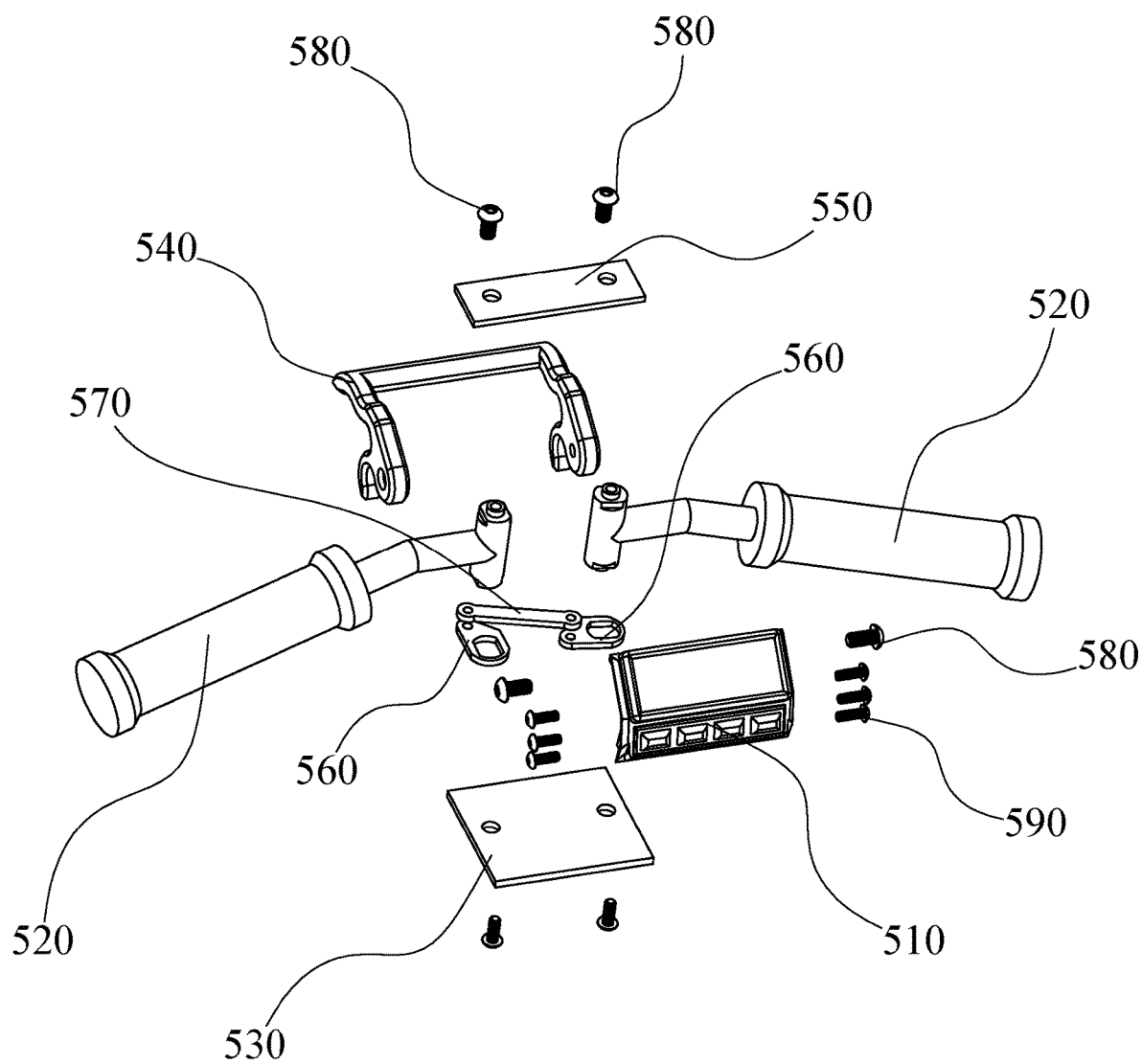
FIG. 21 is an exploded perspective view of the handlebar assembly in accordance with a preferred embodiment of the present invention as shown in FIG. 2.

As shown in FIG. 21, the handlebar assembly comprises a lower crossmember plate 530, an electronic screen component 510, handlebar grips 520, handlebar grip alignment plates 560, handlebar grip alignment plate linkage 570, handlebar grip latch 540, upper crossmember plate 550, and screws 580. The electronic screen component 510 can be solar powered and/or by the battery pack assembly 120 and can display a plurality of different data and/or statistics such as speed and heading direction of the scooter; angle relative to the ground and/or to a vertical axis of the scooter; ambient conditions such as temperature, air pressure, wind speed and direction; and any other equivalent, needed or required data about the scooter and ambient conditions.

Figure 20:
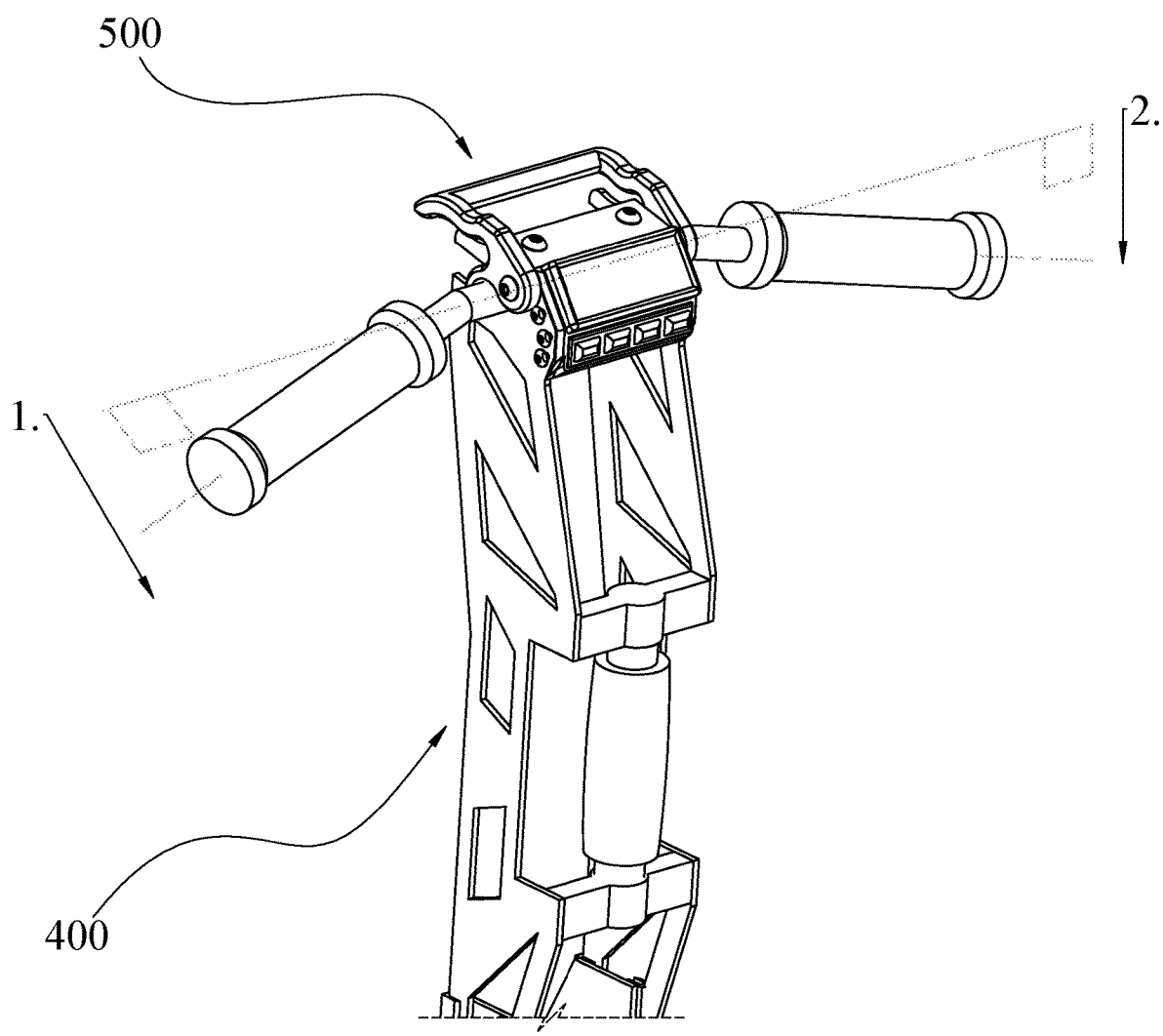
FIG. 20 is a close-up partial perspective view of a handlebar assembly in accordance with a preferred embodiment of the present invention illustrating the downward and backwards slope angle position of the handlebars as shown in FIG. 18.

FIG. 20 is a close-up partial perspective view of the handlebar assembly 500 according to an embodiment of the present invention illustrating how an ergonomic design of the handlebar grips 520 can be achieved by having the position of the handlebar grip 500 tubes and/or plates being bent in a backwards direction 1. and in a downwards direction 2. to prevent rider fatigue and solving the problem of the scooter being unstable because having the handlebar assembly 500 being positioned bent in a backwards direction 1. and in a downwards direction 2. moves the center of gravity lower and further back (front to back of the scooter) on the scooter which creates a more stable ride and handling of the scooter and prevents the scooter from pivoting over and throwing the user over the front of the scooter when hitting a bump or pothole.

Figure 22:
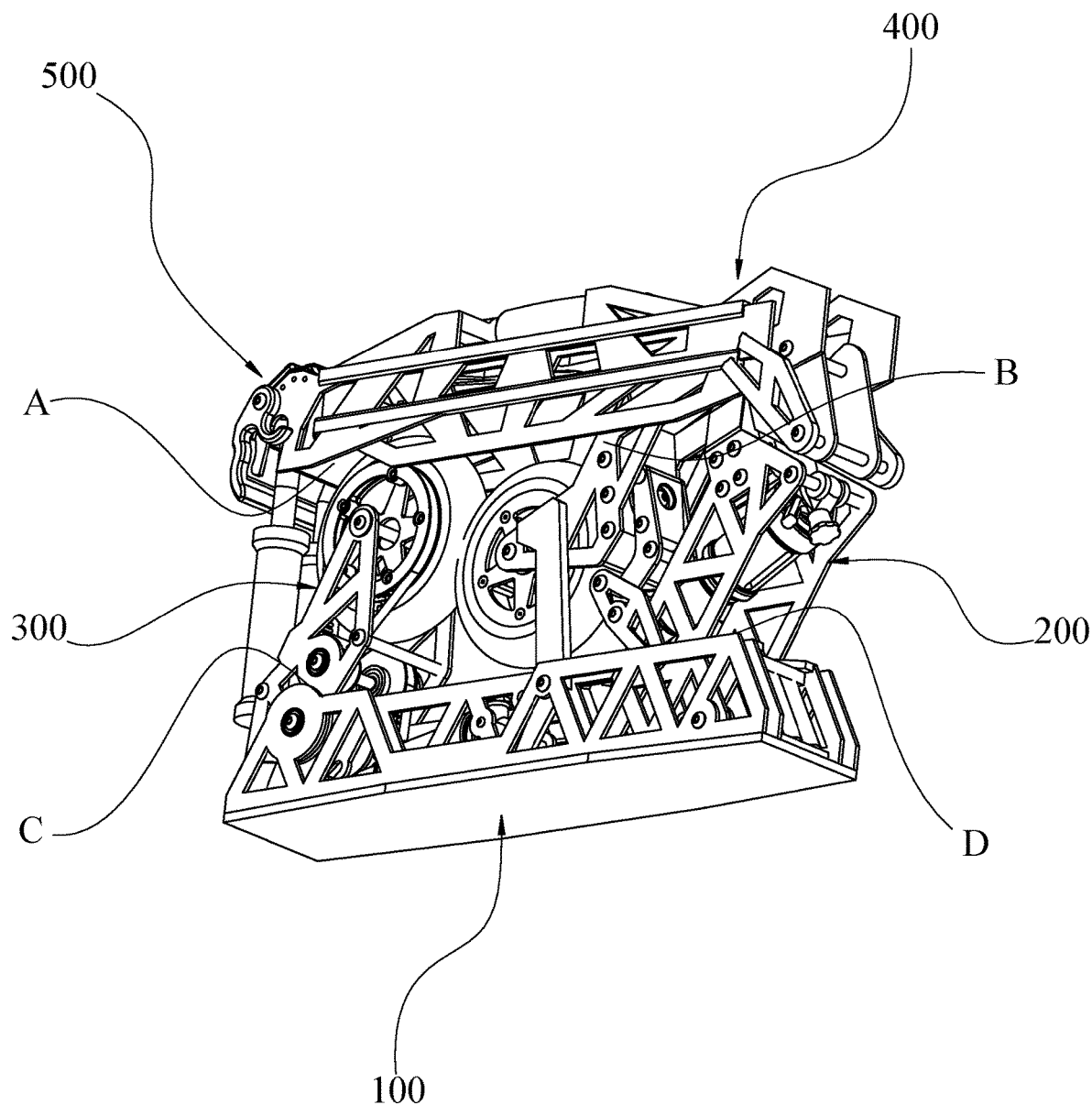
FIG. 22 is a perspective view of the electric scooter in the collapsed position (i.e. closed position) in accordance with a preferred embodiment of the present invention illustrating how the different components of the electric scooter tuck into cavities of the flat plate assemblies to aid in a minimized folding design.

FIG. 22 is a perspective view of the folding electric scooter 1000 in the collapsed position according to an embodiment of the present invention illustrating how the front fork assembly 200, tucks into cavity D in between the flat plates of the main body assembly 100 and into cavity B in between the telescoping plate assembly 400. Additionally, the rear fork assembly 300, tucks into cavity C in between the flat plates of the main body assembly 100 and into cavity A in between the telescoping plate assembly 400 to minimize folding dimensions.

Figure 23:
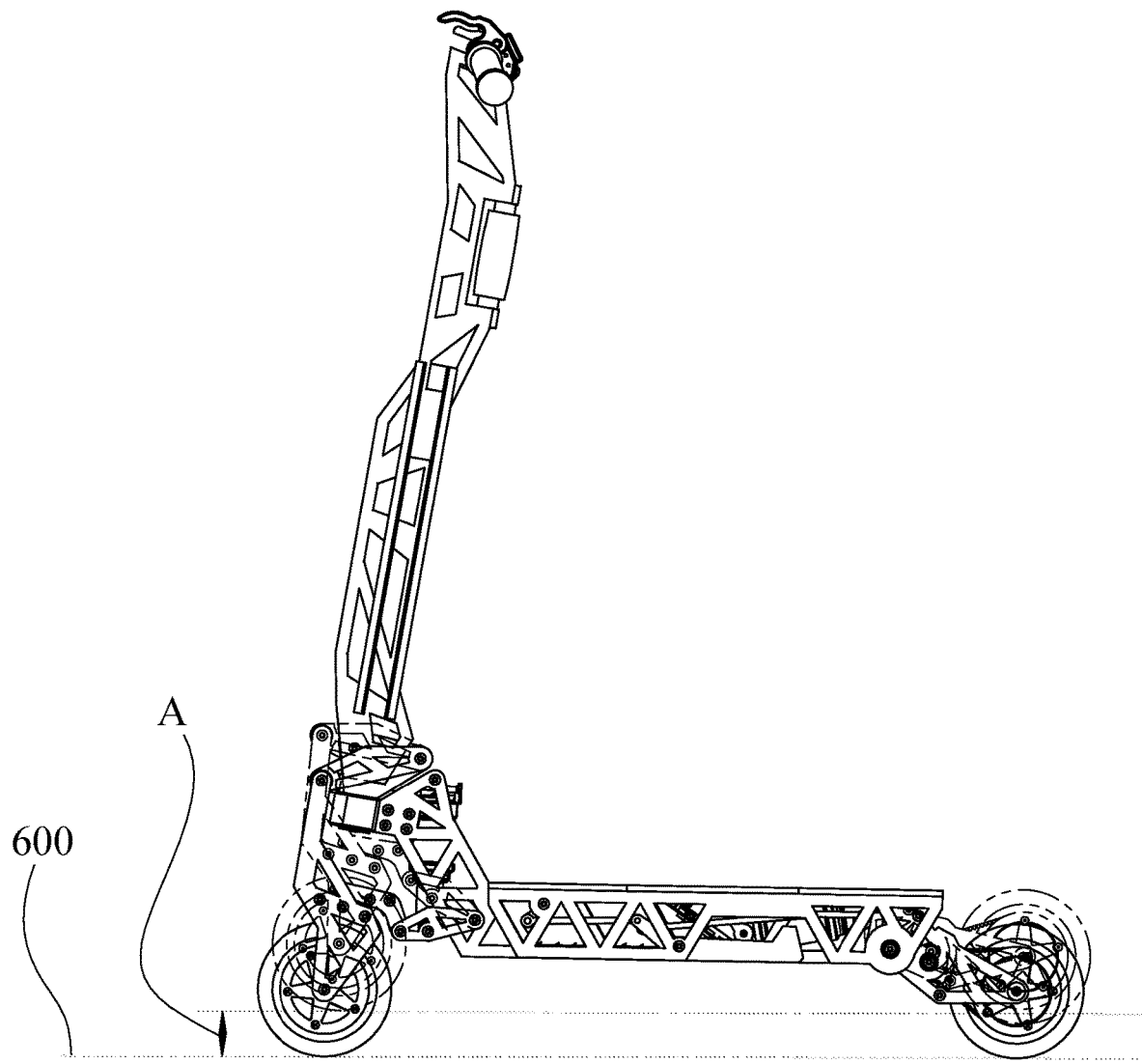
FIG. 23 is a side view of the electric scooter going through its suspension travel in accordance with a preferred embodiment of the present invention.

FIG. 23 is a perspective view of the folding electric scooter 1000 illustrating how the independent double headset suspension allows variable rake angles as the scooter 1000 goes through its suspension travel.

Figure 24:
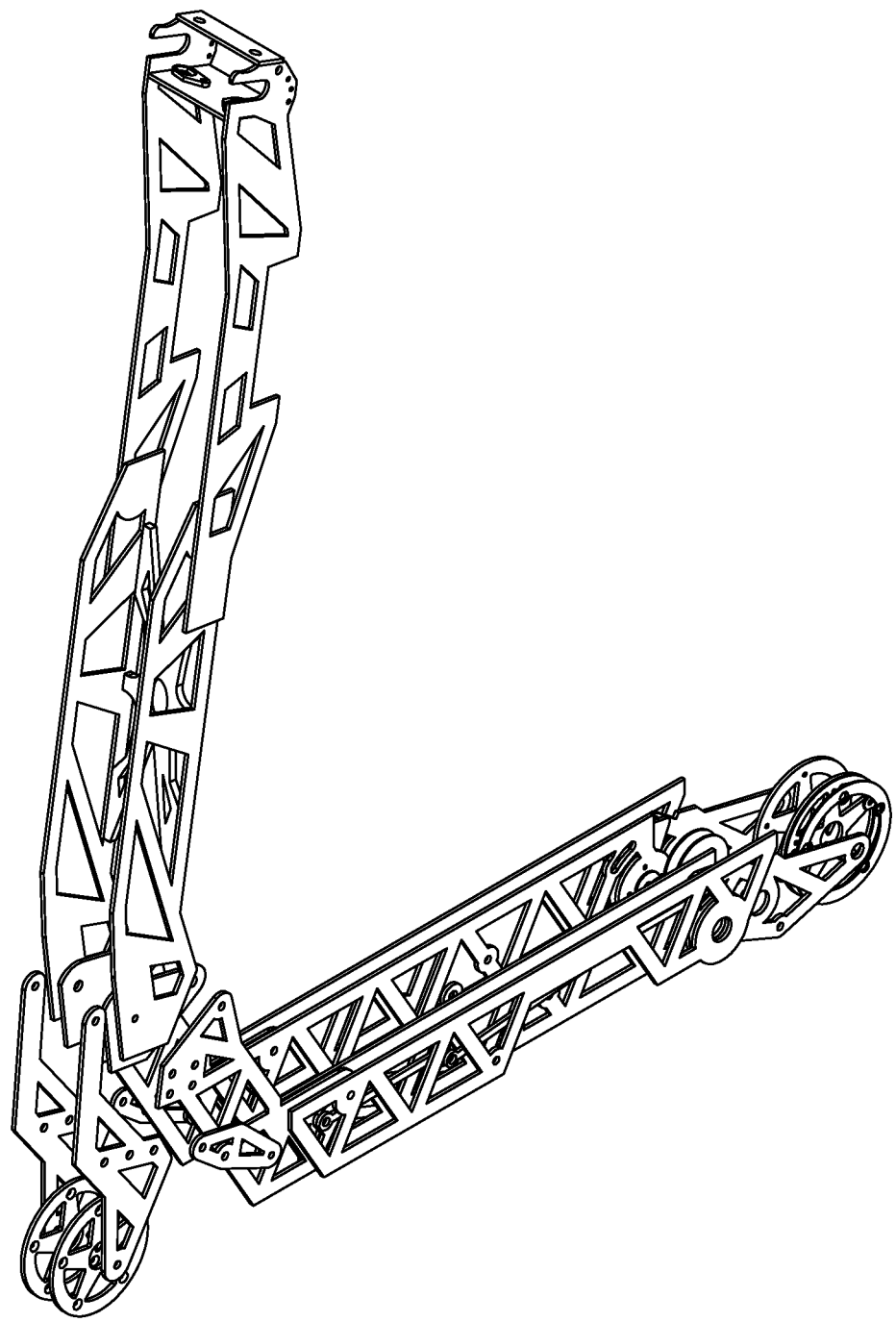
FIG. 24 is a perspective view of the electric scooter stripped of its fasteners and three-dimensional parts in accordance with a preferred embodiment of the present invention illustrating the electric scooter components composed of two-dimensional plates.

FIG. 24 is a perspective view of the folding electric scooter which has been manufactured from only flat plate material such as by the method of stamping flat plates. Therefore, the scooter 1000 is not made from welding which decreases the complexity of manufacturing as well as reducing the skill level of assembly and manufacturing the scooter 1000. In the above FIGS. 1-24, the scooter 1000 can be made from lightweight tempered aircraft grade aluminum, or extremely strong steel or lightweight carbon fiber; or from alloys, steel, galvanized aluminum or steel or composites or carbon fiber or any other equivalent material. Steel can be cut with a CNC Router or laser or water jet. The parts can be manufactured by stamping or 3-D printing. The flat plate material is preferably ⅛" but can be thinner or thicker than ⅛".

ADVANTAGES

Stamping and assembly is a lean and environmentally friendly process (No welding, painting, post of pre machining.)

The scooter is modular and therefore, if one part brakes, there is no need to replace the entire scooter, just have to replace the broken part.

Since the electric scooter is made of flat 2D plates, the scooter 1000 is able to fold the plate into each other, therefore minimizing the size of its folds. Also, when the scooter is in the open position the scooter retains an ideal wheelbase to make the scooter safe, yet light and nimble. The closing procedure results in unlatching 3D printed parts that are spring loaded to help with the motion of closing and opening of the scooter. The user/rider does not have to bend down to collapse the scooter into its unique and industry firsts folding procedure.

What is claimed is:

1. An electric scooter, comprising:
a main body assembly,
a front fork assembly located at a front end of the main body assembly,
a rear fork assembly located at a rear end of the main body assembly,
a telescoping plate assembly located on top of the front fork assembly and
a handlebar assembly located on top of the telescoping plate assembly,
wherein the telescoping plate assembly comprises lower telescoping plates, a lower telescoping plate crossmember, a lower telescoping plate pivot rod, telescoping plate guide rails, upper telescoping plates, upper telescoping plate crossmembers and an upper telescoping plate handle.

2. The electric scooter of claim 1, wherein the upper telescoping plates slide down and within the telescoping plate guard rails.

3. The electric scooter of claim 2, wherein the telescoping plate assembly is configured to collapse by pushing down on the telescoping plate handle along a direction towards the front fork assembly.

4. The electric scooter of claim 3, wherein when the telescoping plate assembly is in a collapsed configuration the telescoping plate is configured to pivot about the lower telescoping plate pivot rod in a direction towards the front fork assembly.

5. The electric scooter of claim 1, wherein the telescoping plate assembly is configured to collapse by pushing down on the telescoping plate handle along a direction towards the front fork assembly.

6. The electric scooter of claim 5, wherein when the telescoping plate assembly is in a collapsed configuration the telescoping plate is configured to pivot about the lower telescoping plate pivot rod in a direction towards the front fork assembly.

7. An electric scooter, comprising:
a main body assembly,
a front fork assembly located at a front end of the main body assembly,
a rear fork assembly located at a rear end of the main body assembly,
a telescoping plate assembly located on top of the front fork assembly and
a handlebar assembly located on top of the telescoping plate assembly, wherein the rear fork assembly comprises a rear wheel assembly, a gear differential assembly, a brushless outrunner electric motor assembly, two rear fork plates, a rear wheel axle, axle bushings, axle bushing spacers, at least one rear air shock canister push rod, an upper crossmember, a lower crossmember rod and screws.

8. The electric scooter of claim 7, wherein the at least one rear air shock canister is adjustable.

9. The electric scooter of claim 7, wherein the brushless outrunner electric motor assembly comprises a brushless outrunner electric motor, brushless outrunner electric motor mounting spacer, a tooth pulley, a tooth pulley spacer, a tooth belt, flanged ball bearings, brushless outrunner electric motor bearing and screws.

10. The electric scooter of claim 7, wherein the gear differential assembly comprises a first tooth pulley, first tooth pulley spacers, a freewheel sprag clutch bearing, a gear differential shaft, a second tooth pulley, second tooth pulley spacers, flanged ball bearings and screws.

11. The electric scooter of claim 7, wherein the rear wheel assembly comprises a curved tooth pulley, curved tooth pulley spacers and a curved tooth fiberglass reinforced rubber belt.

12. The electric scooter of claim 7, wherein the rear wheel assembly has a drivetrain ratio in a range of 2:1-18:1.

13. An electric scooter, comprising:
a main body assembly,
a front fork assembly located at a front end of the main body assembly,
a rear fork assembly located at a rear end of the main body assembly,
a telescoping plate assembly located on top of the front fork assembly and
a handlebar assembly located on top of the telescoping plate assembly, wherein the handlebar assembly comprises a lower crossmember plate, an electronic screen component, handlebar grips, handlebar grip alignment plates, a handlebar grip alignment plate linkage, a handlebar grip latch, an upper crossmember plate and screws.

14. The electric scooter of claim 13, wherein the electronic screen component is powered by the battery pack assembly.

15. The electric scooter of claim 13, wherein the handlebar grips are positioned in a direction back towards the rear fork assembly and positioned downward toward the main body assembly to prevent rider fatigue.

\* \* \* \* \*